(12) United States Patent
Zhamu et al.

(10) Patent No.: US 11,629,420 B2
(45) Date of Patent: Apr. 18, 2023

(54) PRODUCTION PROCESS FOR METAL MATRIX NANOCOMPOSITE CONTAINING ORIENTED GRAPHENE SHEETS

(71) Applicant: Nanotek Instruments, Inc., Dayton, OH (US)

(72) Inventors: Aruna Zhamu, Springboro, OH (US); Yi-jun Lin, Taoyuan (TW); Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 945 days.

(21) Appl. No.: 15/935,636

(22) Filed: Mar. 26, 2018

(65) Prior Publication Data
US 2019/0292672 A1 Sep. 26, 2019

(51) Int. Cl.
| | |
|---|---|
| *C25D 1/00* | (2006.01) |
| *C23C 18/16* | (2006.01) |
| *C22C 26/00* | (2006.01) |
| *C22C 19/03* | (2006.01) |
| *F28F 21/08* | (2006.01) |

(Continued)

(52) U.S. Cl.
CPC ............ *C25D 1/006* (2013.01); *B82B 3/0066* (2013.01); *C22C 9/00* (2013.01); *C22C 19/03* (2013.01); *C22C 26/00* (2013.01); *C23C 18/1657* (2013.01); *C25D 3/12* (2013.01); *C25D 3/38* (2013.01); *C25D 5/54* (2013.01); *C25D 5/56* (2013.01); *F28F 21/02* (2013.01); *F28F 21/089* (2013.01)

(58) Field of Classification Search
CPC .............................. C25D 1/006; B82B 3/0066
See application file for complete search history.

(56) References Cited

U.S. PATENT DOCUMENTS

| | | |
|---|---|---|
| 2,798,878 A | 7/1957 | Hummers |
| 7,071,258 B1 | 7/2006 | Jang et al. |

(Continued)

FOREIGN PATENT DOCUMENTS

EP 3081604 A1 * 10/2016 ............... C09D 5/18

OTHER PUBLICATIONS

PCT/US19/23958 International Search Report and Written Opinion, 20 pages.

(Continued)

*Primary Examiner* — Nicholas R Krasnow

(57) ABSTRACT

Provided is a metal matrix nanocomposite comprising: (a) a metal or metal alloy as a matrix material; and (b) multiple graphene sheets that are dispersed in said matrix material, wherein said multiple graphene sheets are substantially aligned to be parallel to one another and are in an amount from 0.1% to 95% by volume based on the total nanocomposite volume; wherein the multiple graphene sheets contain single-layer or few-layer graphene sheets selected from pristine graphene, graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein the chemically functionalized graphene is not graphene oxide. The metal matrix exhibits a combination of exceptional tensile strength, modulus, thermal conductivity, and/or electrical conductivity.

12 Claims, 8 Drawing Sheets

(51) Int. Cl.
  *C25D 3/12* (2006.01)
  *C25D 3/38* (2006.01)
  *B82B 3/00* (2006.01)
  *F28F 21/02* (2006.01)
  *C22C 9/00* (2006.01)
  *C25D 5/56* (2006.01)
  *C25D 5/54* (2006.01)

(56) References Cited

U.S. PATENT DOCUMENTS

| | | | |
|---|---|---|---|
| 8,263,843 B2 | 9/2012 | Kim et al. | |
| 9,067,796 B2 | 6/2015 | Strupinski | |
| 10,865,474 B2* | 12/2020 | Farquhar | B01D 1/00 |
| 2005/0271574 A1 | 12/2005 | Jang et al. | |
| 2008/0048152 A1 | 2/2008 | Jang et al. | |
| 2009/0295103 A1* | 12/2009 | Ebina | C04B 35/536 |
| | | | 277/650 |
| 2010/0032409 A1* | 2/2010 | Hong | H01L 21/3083 |
| | | | 216/41 |
| 2011/0133132 A1 | 6/2011 | Zhamu et al. | |
| 2011/0285999 A1* | 11/2011 | Kim | G01N 21/552 |
| | | | 356/445 |
| 2012/0077017 A1 | 3/2012 | Buresch et al. | |
| 2013/0068521 A1* | 3/2013 | Hong | H05K 9/0081 |
| | | | 174/388 |
| 2014/0154464 A1* | 6/2014 | Miller | B01D 67/0062 |
| | | | 428/137 |
| 2014/0224466 A1 | 8/2014 | Lin et al. | |
| 2015/0266739 A1* | 9/2015 | Zhamu | C01B 32/182 |
| | | | 428/408 |
| 2017/0158511 A1* | 6/2017 | Braley | B32B 3/266 |
| 2017/0162291 A1 | 6/2017 | Zhamu et al. | |
| 2017/0221643 A1 | 8/2017 | Zhamu et al. | |
| 2018/0077828 A1* | 3/2018 | Braley | B32B 5/022 |
| 2018/0159118 A1* | 6/2018 | Lee | H01M 4/587 |
| 2018/0310442 A1* | 10/2018 | Zhamu | C08K 5/357 |
| 2018/0310443 A1* | 10/2018 | Hong | C23C 16/56 |
| 2019/0169741 A1* | 6/2019 | Farquhar | C23C 16/26 |
| 2019/0292671 A1* | 9/2019 | Zhamu | C23C 18/1635 |
| 2020/0247974 A1* | 8/2020 | Gao | D01F 1/106 |
| 2020/0279665 A1* | 9/2020 | Kim | C09D 11/037 |
| 2020/0339424 A1* | 10/2020 | Thomas | C01B 32/184 |

OTHER PUBLICATIONS

Anderson et al., "The Use of Esters of N-Hydroxysuccinimide in Peptide Synthesis" J. Amer. Chem. Soc. (1964) vol. 86, No. 9, pp. 1839-1842.

Hu et. al., "On the Nucleation of Graphene by Chemical Vapor Deposition" New Journal of Chemistry (2012) vol. 36, pp. 73-77.

Hummers, "Preparation of graphitic oxide" J. Am. Chem. Soc. (1958) vol. 80, p. 1339.

Hwang et al., "Enhanced Mechanical Properties of Graphene/Copper Nanocomposites Using a Molecular-Level mixing process" Advanced Materials (2013) vol. 25, pp. 6724-6729.

Karlicky et al., "Halogenated Graphenes: Rapidly Growing Family of Graphene Derivatives" ACS Nano (2013) vol. 7, No. 8, pp. 6434-6464.

Li et al., "Conductive enhancement of copper/graphene composites based on high-quality graphene" Royal Society of Chemistry Advances (2015) vol. 5, pp. 80428-80433.

Wang et al., "Effect of the content of ball-milled expanded graphite on the bending and tribological properties of copper-graphite composites" Materials and Design (2013) vol. 47, pp. 667-671.

U.S. Appl. No. 15/935,624 Nonfinal Office Action dated Feb. 19, 2021, 7 pages.

* cited by examiner

PRODUCTION PROCESS FOR METAL
MATRIX NANOCOMPOSITE CONTAINING
ORIENTED GRAPHENE SHEETS

FIELD OF THE INVENTION

The present disclosure relates generally to the field of metal matrix composite and, more particularly, to a metal matrix composite containing highly oriented graphene sheets and a process for producing same.

BACKGROUND OF THE INVENTION

Potential applications of graphene reinforced metal matrix composites (also hereinafter referred to as graphene-metal nanocomposites or graphene-metal composites) take advantage of five major areas of property enhancement: electrical conductivity, thermal conductivity, mechanical property enhancement, grain boundary pinning, and barrier properties. Examples of specific applications include heat sinks, electronic housings, EMI shielding, and metal components used in harsh environment. Electrically conductive graphene-metal nanocomposites also provide major opportunities for deicing of aircraft body panels, automobiles, trains, windows, and solar modules.

In the instant specification, graphene sheets, also referred to as nanographene platelets (NGPs), refer to single-layer or few-layer graphene sheets selected from a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof. A few-layer graphene sheet contains 2-10 graphene planes (one atom thick hexagonal planes of carbon atoms).

Four main prior art approaches have been followed to produce graphene-metal nanocomposites. They are outlined in FIG. 1, and briefly summarized as follows:

Method 1: Ball Milling of Graphene or Expanded Graphite with Metal Particles to Produce Graphene-Metal Nanocomposites In this prior art approach, graphene is pre-created or expanded graphite is produced by an intercalation and exfoliation process. In brief, graphitic material is first intercalated with acids to create a graphite intercalation compound (GIC). The GIC is washed and dried, then subjected to the second step of expansion. In this step, heat, microwave energy or plasma is used to expand the GIC via rapid expansion of the intercalant. This is a dramatic, exothermal process with a volume expansion of 50 to 300 times, accompanied by release of acid fumes as the intercalant escapes. The platelets created by this process are still attached at some edges, creating long particles with a thickness similar to that of the platelet width of the original GIC. These are sometimes referred to as "graphite worms" because of their appearance.

Wang et al. teach the addition of expanded graphite to copper powders, followed by ball milling to separate expanded graphite attachments and coat them onto metal powders, followed by a final sintering step [Wang, et al. "Effect of the content of ball-milled expanded graphite on the bending and tribological properties of copper-graphite composites," Materials and Design May 2013; 47:667-671]. Li, et al. reported an electrical conductivity enhanced copper/graphene composite based on high-quality graphene (HQG) via processes involving graphene-coated copper powders through ball milling, and subsequent spark plasma sintering (SPS). The HQG is converted from regular reduced graphene oxide (RGO) by using a hot-pressing treatment [Li, et al. "Conductive enhancement of copper/graphene composites based on high-quality graphene," RSC Advance, 2015, 5, 80428-80433].

The use of graphene or expanded/exfoliated graphite (made by thermally exfoliating GIC) as an input material for a ball mill process to create graphene composites has several significant disadvantages:
1. Ball milling can induce additional size reduction of graphene sheets and additional damage to graphene sheets.
2. It is difficult for ball-milling to well-disperse graphene sheets in a metal matrix.
3. With a liquid carrier in a ball mill, a drying step is required. The oven drying process can cause nanoscale agglomeration of graphene particles. This material cannot be de-agglomerated by a 40 mesh screen, yet use of an appropriate mesh size (625 mesh or higher) is not possible due to coated particles clogging the mesh.
4. Ball milling does not allow for control of graphene sheet orientation.
5. Ball milling does not allow for dispersion of a large volume fraction of graphene sheets in a metal matrix.

Method 2: Infiltration of Metal into Graphene Sheets

Kim et al [U.S. Pat. No. 8,263,843, Graphene Nanoplatelet Metal Matrix] teaches a process of forming a porous graphene film on a sacrificial material, removing that material by heat or chemicals, and infiltrating the porous material with metal by electrolytic plating, electroless plating, evaporation or sputtering. This process can be repeated layer by layer to create a solid material of the desired shape. This process has several disadvantages:
1. The creation of a porous graphene film on a metal mesh or sacrificial material does not create mechanically strong attachments between adjacent platelets. The porous film is likely to be displaced and any intentional planar platelet orientation reduced during the matrix infiltration process.
2. Air pockets or pockets of plating solution are likely to be formed during the infiltration process. This process does not have a clearly defined method to remove these.
3. This process does not allow for aligning constituent graphene sheets in the foam to become parallel to one another.

Method 3: Molecular Level Mixing Process

J. Hwang, et al. ["Enhanced Mechanical Properties of Graphene/Copper Nanocomposites Using a Molecular-Level mixing process," Advanced Materials 2013, 25, 6724-6729] teaches a method of functionalizing graphene oxide with copper acetate, followed by addition of NaOH to reduce copper ions to CuO, forming copper/graphene nanopowders. These were reduced at 400° C. for 3 hours under hydrogen atmosphere, followed by spark plasma sintering at 50 MPa, 600° C., to form test samples.

This method has several challenges and limitations for industrial production:
1. This method requires the use of metal oxide first, which must be later reduced to metal.
2. This method does not allow for control of the graphene sheet orientation.
3. Only a 2.5% by volume of graphene sheets was dispersed in the metal matrix. There is no evidence to indicate the possibility of forming metal matrix nanocomposites that contain a higher proportion of graphene sheets by following this approach.

Method 4: CVD Graphene onto Metal Particles

Strupinski [U.S. Pat. No. 9,067,796 B2, "Method of manufacturing microscopic graphene-containing grains and material obtainable thereby"] teaches a CVD process to grow graphene onto metal particles. In one example, graphene is grown onto copper grains at 600 to 1040° C. This method has some significant disadvantages:

1. Composite matrix materials are limited to those that are successful templates or catalysts for graphene growth by CVD: Cu, Ni, Ru, Ir, Co, Pt, Pd and W. This process cannot be used with other metal elements, glass or ceramic particles.
2. Successful production of graphene (versus amorphous carbon) is dependent on crystallographic orientation of the template particle for some CVD processes. For example, graphene is produced with a crystallographic orientation of (111) on copper versus amorphous carbon with a crystallographic orientation of (100) or (110). With (100) and (110) orientation, overcoming the production of amorphous carbon requires additional input gases and higher process temperatures. [Hu et al, On the Nucleation of Graphene by Chemical Vapor Deposition, New Journal of Chemistry January 2012; 36(1):73-77].
3. The process is energy intensive, gas intensive and requires costly plasma generation equipment. Propane is an expensive carbon source compared to graphite.
4. Deposition of graphene on metal particles is not conducive to the formation of metal matrix composites having oriented graphene sheets. Since only 1-3 layers of graphene can be formed on a catalytic metal substrate, this process is not amenable to the incorporation of a high graphene proportion in a metal matrix, limiting the scope of usage of the resulting composite materials.

The present disclosure was made to overcome the limitations of prior art processes outlined above.

SUMMARY OF THE INVENTION

In certain embodiments, the present disclosure provides a metal matrix nanocomposite comprising: (A) a metal or metal alloy as a matrix material, wherein the metal or metal alloy contains silver (Ag), gold (Au), platinum (Pt), zinc (Zn), cadmium (Cd), titanium (Ti), vanadium (V), cobalt (Co), nickel (Ni), manganese (Mn), iron (Fe), molybdenum (Mo), tungsten (W), niobium (Nb), aluminum (Al), magnesium (Mg), tin (Sn), indium (In), lead (Pb), an alloy thereof, a combination thereof, or a combination thereof with copper (Cu); and (B) multiple graphene sheets that are dispersed in the matrix material, wherein the multiple graphene sheets are substantially aligned to be parallel to one another and are in an amount from 0.1% to 95% by volume based on the total nanocomposite volume; wherein the multiple graphene sheets contain single-layer or few-layer graphene sheets selected from a pristine graphene material having essentially zero % of non-carbon elements, or a non-pristine graphene material having 0.001% to 25% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein the chemically functionalized graphene is not graphene oxide.

Preferably, in the above-cited embodiments, the graphene sheets are in an amount from 10% to 95% by volume and graphene sheets are spaced by the matrix material having an average spacing from 1 nm to 300 nm.

In some embodiments, the disclosure provides a metal matrix nanocomposite comprising: (A) a metal or metal alloy as a matrix material, wherein the metal or metal alloy contains copper (Cu), a Cu alloy, or a combination thereof with aluminum (Al), magnesium (Mg), tin (Sn), indium (In), lead (Pb), or a transition metal; (B) multiple graphene sheets that are dispersed in the matrix material, wherein the multiple graphene sheets are substantially aligned to be parallel to one another and are in an amount from 0.1% to 95% by volume based on the total nanocomposite volume; wherein the multiple graphene sheets contain single-layer or few-layer graphene sheets selected from a pristine graphene material having essentially zero % of non-carbon elements, or a non-pristine graphene material having 0.001% to 25% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein the chemically functionalized graphene is not graphene oxide and the graphene sheets are spaced by the matrix material having an average spacing from 1 nm to 300 nm. Preferably, the graphene sheets are in an amount from 10% to 95% by volume.

Preferably, the transition metal is selected from silver (Ag), gold (Au), copper (Cu), platinum (Pt), zinc (Zn), cadmium (Cd), titanium (Ti), vanadium (V), cobalt (Co), nickel (Ni), manganese (Mn), iron (Fe), molybdenum (Mo), tungsten (W), niobium (Nb), an alloy thereof, or a combination thereof.

In all the aforementioned embodiments, the graphene sheets are preferably in an amount from 20% to 95% by volume and graphene sheets are spaced by the matrix material having an average spacing from 1 nm to 150 nm. Further preferably, the graphene sheets are in an amount from 50% to 95% by volume and graphene sheets are spaced by the matrix material having an average spacing from 1 nm to 70 nm. Still further preferably, the graphene sheets are in an amount from 75% to 95% by volume and the graphene sheets are spaced by the matrix material having an average spacing from 1 nm to 30 nm.

In certain preferred embodiments, the graphene sheets contain mostly single-layer graphene (90% to 100%) having an average number of layers between 1 and 2. In certain embodiments, the graphene sheets contain single-layer graphene and few-layer graphene sheets having an average number of layers less than 5. Few-layer graphene is commonly defined as those graphene sheets having 2-10 layers of graphene planes.

In some highly useful embodiments, the nanocomposite is in a thin film form having a thickness from 5 nm to 500 μm and the graphene sheets are substantially aligned parallel to a thin film plane. In some preferred embodiments, the nanocomposite is in a thin film form having a thickness from 10 nm to 100 μm and graphene sheets being aligned parallel to a thin film plane.

Typically, the disclosed metal matrix nanocomposite has a tensile strength no less than 300 MPa, a tensile modulus no less than 75 GPa, a thermal conductivity no less than 500 W/mK, and/or an electrical conductivity no less than 5,000 S/cm, all measured along a thin film plane direction. Typically and preferably, the metal matrix nanocomposite has a tensile strength no less than 400 MPa, a tensile modulus no less than 150 GPa, a thermal conductivity no less than 800 W/mK, and/or an electrical conductivity no less than 8,000 S/cm, all measured along a thin film plane direction. In many cases, the metal matrix nanocomposite has a tensile strength no less than 500 MPa, a tensile modulus no less than 250 GPa, a thermal conductivity no less than 1,200 W/mK, and/or an electrical conductivity no less than 12,000 S/cm, all measured along a thin film plane direction. Some of the disclosed metal matrix nanocomposites exhibit a tensile strength no less than 600 MPa, a tensile modulus no less than 350 GPa, a thermal conductivity no less than 1,500 W/mK, and/or an electrical conductivity no less than 20,000 S/cm, all measured along a thin film plane direction.

Typically, the disclosed metal matrix nanocomposite exhibits a Vickers hardness value from 70 to 400 HV.

In certain embodiments, the graphene sheets contain a functional group attached thereto to make the graphene sheets exhibit a negative Zeta potential having a value from −55 mV to −0.1 mV.

The graphene sheets may contain a chemical functional group selected from alkyl or aryl silane, alkyl or aralkyl group, hydroxyl group, carboxyl group, epoxide, carbonyl group, amine group, sulfonate group (—$SO_3H$), aldehydic group, quinoidal, fluorocarbon, or a combination thereof.

In certain embodiments, the graphene sheets contain chemically functionalized graphene sheets having a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The graphene sheets may contain a chemical functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'N$^+$(R')$_3$X$^-$, R'Si(~OR'—)$_y$R'$_{3-y}$, R'Si(—O—SiR'$_2$—)OR', R'—R", R'—N—CO, ($C_2H_4O$—)$_w$H, (—$C_3H_6O$—)$_w$—R', ($C_3H_6O$)$_w$—R', R', and w is an integer greater than one and less than 200.

The present invention also provides an electronic device containing the aforementioned metal matrix nanocomposite as a component (e.g. as a thermal management element).

Additionally, the present disclosure provides a structural member containing the disclosed metal matrix nanocomposite as a load-bearing element.

The present disclosure also provides a process for producing a metal matrix nanocomposite. The process comprises: (A) Preparing a graphene dispersion comprising multiple discrete graphene sheets dispersed in a liquid adhesive resin; (B) bringing the graphene dispersion in physical contact with a solid substrate surface and aligning the graphene sheets along a planar direction of said substrate surface wherein the graphene sheets are bonded to and supported by said substrate surface; (B) depositing a thin layer of a metal or metal alloy, having a thickness from 0.5 nm to 10 μm, onto surfaces of the aligned graphene sheets to form a layer of metal-coated graphene sheets supported by said substrate surface, wherein said metal or metal alloy contains a transition metal, aluminum (Al), magnesium (Mg), tin (Sn), indium (In), lead (Pb), an alloy thereof, or a combination thereof; and (C) separating the layer of metal-coated graphene sheets from the substrate surface and consolidating the layer of metal-coated graphene sheets into a metal matrix nanocomposite wherein the graphene sheets are dispersed in the metal matrix material, substantially aligned to be parallel to one another, and in an amount from 0.1% to 95% by volume based on the total nanocomposite volume.

In some embodiments, step (B) includes a procedure selected from spraying, painting, coating, casting, or printing a layer of the graphene dispersion onto the substrate surface and aligning the graphene sheets along a planar direction of the substrate surface so that graphene sheets are substantially parallel to one another and are bonded to and supported by the substrate surface. The solid substrate may contain a polymer film having a thickness from 5 μm to 200 μm.

In certain embodiments, step (B) includes a procedure (i) of feeding a continuous polymer film, as the solid substrate, from a polymer film feeder into a graphene deposition chamber containing said graphene dispersion therein and a procedure (ii) of operating the graphene deposition chamber to deposit the graphene sheets and the adhesive resin to at least a primary surface of the polymer film for forming a graphene-coated polymer film; and wherein step (C) includes moving the graphene-coated polymer film into a metallization chamber which accommodates a plating solution for plating a layer of the metal or metal alloy onto the graphene-coated polymer film to obtain the layer of metal-coated graphene sheets supported on the polymer film; and the step further includes a procedure of operating a winding roller to collect layer of metal-coated graphene sheets supported on the polymer film.

In certain embodiments, step (C) includes immersing the graphene sheets supported on said substrate surface into a metallization chamber which accommodates a plating solution for plating a layer of the metal or metal alloy onto the graphene sheets to obtain the layer of metal-coated graphene sheets supported on the substrate surface.

In certain embodiments, step (C) includes operating a procedure of sputtering, physical vapor deposition, chemical vapor deposition, plasma-assisted deposition, spraying, painting, coating, casting, or printing for depositing a thin layer of metal or metal alloy onto the graphene sheets.

In some specific embodiments, the disclosure also provides a process for producing the aforementioned metal matrix nanocomposite. In certain embodiments, the process comprises: (a) depositing a thin layer of a metal on surfaces of multiple graphene sheets having a lateral dimension (length, width, or diameter) from 5 nm to 100 μm (excluding the long and wide pristine graphene film produced from catalytic chemical vapor deposition or CVD that is typically several centimeters wide, up to several meters wide) to produce multiple metal-coated graphene sheets; (b) aligning or orientating the metal-coated graphene sheets along a desired direction; and (c) consolidating these metal-coated graphene sheets into a metal matrix nanocomposite having graphene sheets substantially oriented parallel to one another. This nanocomposite is typically characterized by having a "bricks and mortar" structure having bricks (graphene sheets) being spaced by mortar (metal matrix) with an average spacing typically smaller than 1 more typically smaller than 300 nm, further more typically smaller than 100 nm, and most desirably smaller than 10 nm (the spacing can be as small as 0.5 nm).

Step (a) typically begins with a step of producing isolated graphene sheets via chemical oxidation/intercalation of graphite, liquid phase exfoliation of graphite, electrochemical exfoliation of graphite, supercritical fluid exfoliation of graphite, or high-shear exfoliation of graphite, etc. These processes result in the formation of isolated, discrete graphene sheets that have a lateral dimension from 5 nm to 100 μm and a thickness from one atomic carbon plane of hexagonal carbon atoms (single-layer graphene, as small as 0.34 nm) to 10 hexagonal planes (2-10 planes, or few-layer graphene).

In step (a), one or both primary surfaces of a graphene sheet can be deposited with a thin layer of metal via sputtering, physical vapor deposition, chemical vapor deposition, electrochemical deposition (electroplating), chemical plating (e.g. electroless plating, electrophoretic deposition, etc.

Electroplating of a plurality of isolated graphene sheets may be conducted by confining these graphene sheets in a porous cage (e.g. metal wire cage), which is immersed in an electrochemical electrolyte (e.g. $CuSO_4$ dissolved in water) of an electrochemical reactor chamber. A current is imposed between this working electrode and a counter-electrode (e.g. a piece of Cu) until a desired thickness of metal (e.g. Cu) is plated onto graphene sheet surfaces.

For electroless plating, graphene oxide (GO) sheets may be employed as template and hydrazine hydrate as a reductant for both GO and cupric ion. Copper-coated reduced graphene oxide (RGO) may be fabricated by the ultrasound-assisted electroless copper plating process. A uniform Cu layer can be coated onto each of the two sides (primary surfaces) of an RGO sheet without using an externally applied voltage. The Cu layer thickness may be varied between 1 nm and 200 nm.

Preferably, the process further contains a step of chemically functionalizing the graphene sheets (pristine graphene, graphene oxide, reduced graphene oxide, fluorinated graphene, nitrogenated graphene, etc.) so that the graphene sheets exhibit a negative Zeta potential preferably from −55 mV to −0.1 mV in a desired solution. This Zeta potential can promote attraction of metal ions to graphene surfaces.

In certain embodiments, the process further comprises, prior to step (a), a step of subjecting the graphene surface to an activation treatment, an etching treatment, or a combination thereof. In some embodiments, step (a) includes a step of subjecting the graphene sheet surfaces to an etching treatment using an etchant selected from an acid, an oxidizer, a metal salt, or a combination thereof.

Preferably, the process further comprises, prior to step (a), a step of subjecting the graphene sheet surfaces to an etching treatment without using chromic acid or chromosulfuric acid. More preferably, the process further comprises, prior to step (a), a step of subjecting the graphene sheets to an etching treatment using an etchant selected from an acid, an oxidizer, a metal salt, or a combination thereof under a mild etching condition wherein etching is conducted at a sufficiently low temperature for a sufficiently short period of time so as not to create micro-caverns having an average size greater than 0.1 μm.

In step (b), alignment of metal-coated graphene sheets can be achieved through a forced assembly approach that are schematically illustrated in FIG. 3(A), FIG. 3(B), FIG. 3(C), and FIG. 3(D). Thus, the present disclosure also provides a process for producing a metal matrix nanocomposite, the said process comprising: (a) Dispersing multiple discrete graphene sheets in a liquid electrolyte and electrochemically or chemically deposit a thin layer of a metal or metal alloy, having a thickness from 0.5 nm to 10 μm, onto surfaces of the graphene sheets to form metal-coated graphene sheets dispersed in the liquid electrolyte to form a metal-coated graphene dispersion; (b) subjecting the metal-coated graphene dispersion to a forced assembling and orientating procedure, forcing the metal-coated graphene sheets to form a layer of aligned metal-coated graphene sheets that are substantially parallel to one another; and (c) consolidating the layer of aligned metal-coated graphene sheets into a metal matrix nanocomposite wherein the graphene sheets are dispersed in the metal matrix material, substantially aligned to be parallel to one another, and in an amount from 0.1% to 95% by volume based on the total nanocomposite volume; wherein the metal contains a transition metal, aluminum (Al), magnesium (Mg), tin (Sn), indium (In), lead (Pb), an alloy thereof, or a combination thereof.

In the process of claim, the forced assembling and orientating procedure may include introducing the metal-coated graphene dispersion, having an initial volume $V_1$, in a mold cavity cell and driving a piston into the mold cavity cell to reduce the metal-coated graphene dispersion volume to a smaller value $V_2$, allowing excess liquid electrolyte to flow out of the cavity cell and aligning the metal-coated graphene sheets along a desired direction.

In certain embodiments, the forced assembling and orientating procedure includes introducing the metal-coated graphene dispersion in a mold cavity cell having an initial volume $V_1$, and applying a suction pressure through a porous wall of the mold cavity to reduce the metal-coated graphene dispersion volume to a smaller value $V_2$, allowing excess liquid electrolyte to flow out of the cavity cell through the porous wall and aligning the metal-coated graphene sheets along a desired direction.

The forced assembling and orientating procedure may include introducing a first layer of said metal-coated graphene dispersion onto a surface of a supporting conveyor and driving said layer of metal-coated graphene dispersion supported on said conveyor through at least a pair of pressing rollers to reduce a thickness of the metal-coated graphene dispersion layer and align the metal-coated graphene sheets along a direction parallel to said conveyor surface for forming a layer of aligned metal-coated graphene sheets.

The process may further include a step of introducing a second layer of a metal-coated graphene dispersion onto a surface of the layer of metal-coated graphene sheets to form a two-layer structure, and driving the two-layer structure through at least a pair of pressing rollers to reduce a thickness of the second layer of metal-coated graphene dispersion and align the metal-coated graphene sheets along a direction parallel to the conveyor surface for forming a layer of metal-coated graphene sheets.

The process may further include a step of compressing or roll-pressing the layer of metal-coated graphene sheets to reduce a thickness of the layer and to improve orientation of the metal-coated graphene sheets.

Thus, in some specific embodiments, the disclosure also provides an alternative procedure to obtain aligned metal-coated graphene sheets that are bonded on a primary surface of a polymer film. This procedure comprises:
(a) Feeding a continuous polymer film from a polymer film feeder into a graphene deposition chamber, wherein the graphene deposition chamber accommodates a graphene dispersion comprising multiple discrete graphene sheets dispersed in a liquid adhesive resin (e.g. uncured monomer and a curing agent);

(b) Operating the graphene deposition chamber to deposit the graphene sheets and the adhesive resin to at least a primary surface of the polymer film for forming a graphene-coated polymer film;
(c) Moving the graphene-coated film into a metallization chamber which accommodates a plating solution for plating a layer of a desired metal onto the graphene-coated polymer film to obtain a surface-metalized polymer film; and
(d) Operating a winding roller to collect the surface-metalized polymer film;
wherein the multiple graphene sheets contain single-layer or few-layer graphene sheets selected from a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof. One or both primary surfaces of a polymer films may be metallized in this process wherein a surface is deposited with aligned graphene sheets that are in turn covered with a thin layer of metal. The plating solution may contain an electroless chemical plating solution, an electrochemical plating solution, or an electrophoretic solution.

Step (c) may contain immersing the polymer film in a metallizing bath to accomplish chemical plating or electroless plating. The high electrical conductivity of deposited graphene sheets and conductive filler enables plating of metal layer(s) on graphene-coated polymer film surfaces. Alternatively, one may choose to use physical vapor deposition, sputtering, plasma deposition, etc. to accomplish the final metallization procedure.

The process may further comprise operating a drying, heating, or curing means to partially or completely remove the liquid medium (if present) from the graphene-coated polymer film and to polymerize or cure the adhesive resin for producing the graphene-coated polymer film containing the multiple graphene sheets that are bonded to the at least a primary surface or both primary surfaces of the polymer film.

The adhesive may be a "tentative" adhesive that allows for easy peeling off of the layer of metal-covered graphene sheets from the polymer film. Otherwise, the supporting polymer film may be dissolved by using a solvent or may be burnt off, leaving behind the layer of metal-covered graphene sheets. Smaller pieces may be cut and slit from this layer of metal-covered graphene sheets, stacked together, and then subjected to a consolidation treatment (e.g. by melting the metal, compacting the structure and the solidifying the structure to form a metal matrix nanocomposite or by sintering).

In the disclosed process, step (b) may contain immersing the polymer film in a metallizing bath. In a preferred procedure, step (b) includes a step of dipping the polymer film containing the layer of bonded graphene sheets/conductive filler into and then retreating from a chemical plating bath containing a metal salt dissolved in a liquid medium to effect metallization of the polymer film surface.

In certain embodiments, the graphene dispersion contains an adhesive resin having an adhesive-to-graphene weight ratio from 1/5000 to 1/10.

DESCRIPTION OF THE PREFERRED EMBODIMENTS

Figure 1:
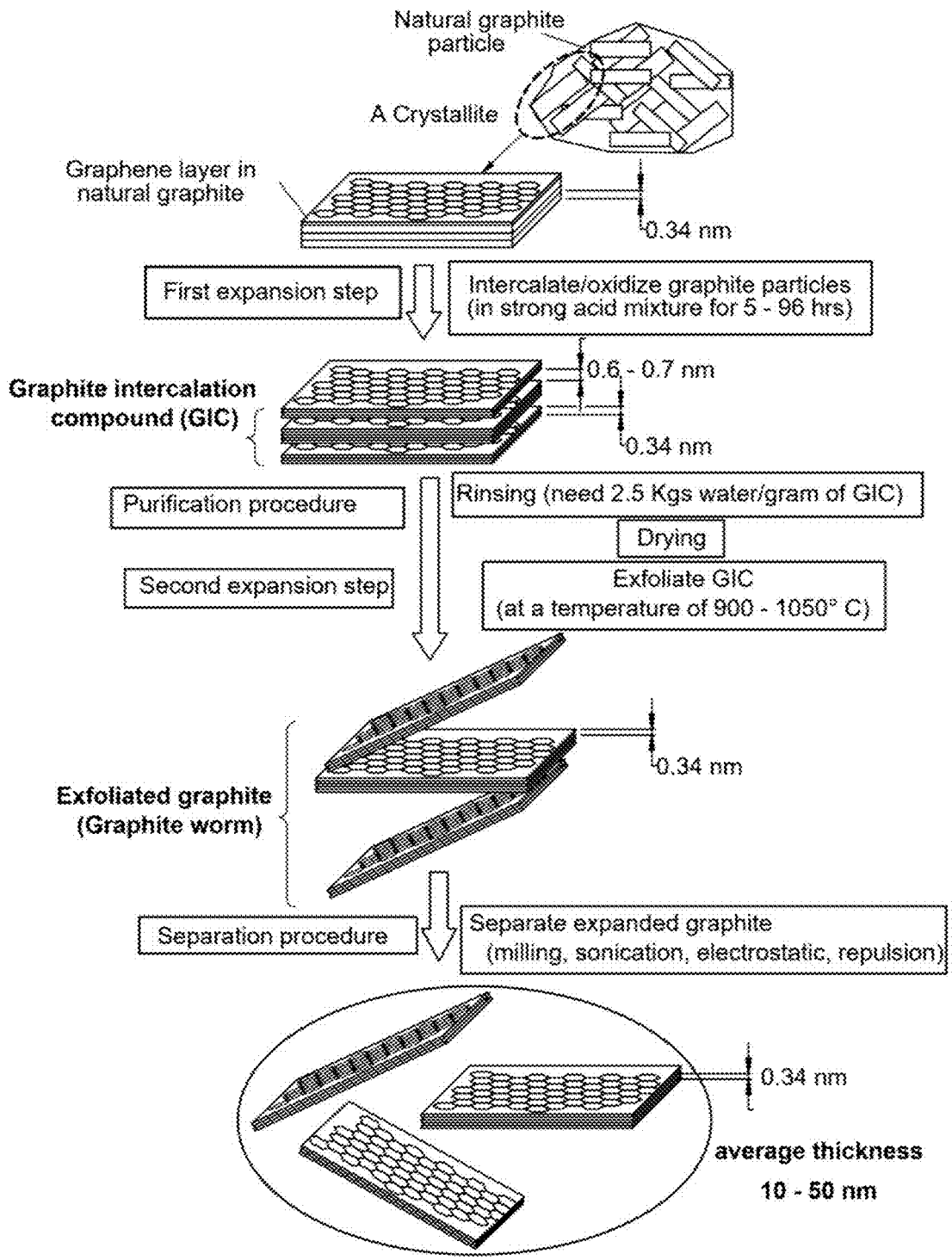
FIG. 1 A flow chart showing the most commonly used process for producing oxidized graphene sheets that entails chemical oxidation/intercalation, rinsing, and high-temperature exfoliation procedures.
Figure 2:
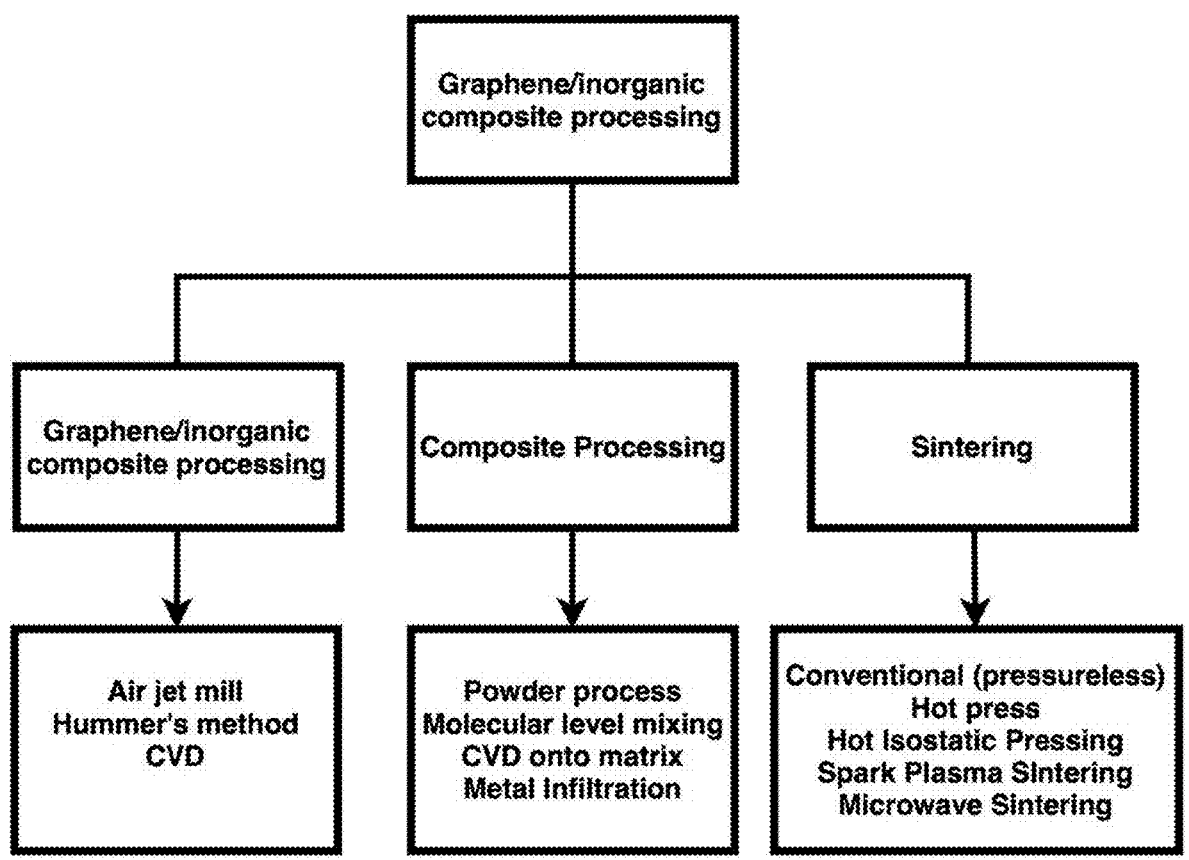
FIG. 2 Schematic of prior art processes for producing graphene-reinforced inorganic matrix composites.

The following includes definitions of various terms and phrases used throughout this specification.

The term "graphene sheets" means a material comprising one or more planar sheets of bonded carbon atoms that are densely packed in a hexagonal crystal lattice in which carbon atoms are bonded together through strong in-plane covalent bonds, and further containing an intact ring structure throughout a majority of the interior. Preferably at least 80% of the interior aromatic bonds are intact. In the c-axis (thickness) direction, these graphene planes may be weakly bonded together through van der Waals forces. Graphene sheets may contain non-carbon atoms at their edges or surface, for example OH and COOH functionalities. The term graphene sheets includes pristine graphene, graphene oxide, reduced graphene oxide, halogenated graphene including graphene fluoride and graphene chloride, nitrogenated graphene, hydrogenated graphene, doped graphene, functionalized graphene, and combinations thereof. Typically, non-carbon elements comprise 0 to 25 weight % of graphene sheets. Graphene oxide may comprise up to 53% oxygen by weight. The term "doped graphene" encompasses graphene having less than 10% of a non-carbon element. This non-carbon element can include hydrogen, oxygen, nitrogen, magnesium, iron, sulfur, fluorine, bromine, iodine, boron, phosphorus, sodium, and combinations thereof. Graphene sheets may comprise single-layer graphene or few-layer graphene, wherein the few-layer graphene is defined as a graphene platelet formed of less than 10 graphene planes. Graphene sheets may also comprise graphene nanoribbons. "Pristine graphene" encompasses graphene sheets having essentially zero % of non-carbon elements. "Nanographene platelet" (NGP) refers to a graphene sheet having a thickness from less than 0.34 nm (single layer) to 100 nm (multilayer).

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5% of a referenced range.

The term "essentially" and its variations are defined as being largely but not necessarily wholly what is specified as understood by one of ordinary skill in the art, and in one non-limiting embodiment substantially refers to ranges within 10%, within 5%, within 1%, or within 0.5% of a referenced range.

Other objects, features and advantages of the present invention may become apparent from the following figures, description, and examples. It should be understood, however, that the figures, description, and examples, while indicating specific embodiments of the invention, are given by way of illustration only and are not meant to be limiting. In further embodiments, features from specific embodiments may be combined with features from other embodiments.

The present disclosure provides a metal matrix nanocomposite comprising: (A) a metal or metal alloy as a matrix material, wherein the metal or metal alloy contains silver (Ag), gold (Au), platinum (Pt), zinc (Zn), cadmium (Cd), titanium (Ti), vanadium (V), cobalt (Co), nickel (Ni), manganese (Mn), iron (Fe), molybdenum (Mo), tungsten (W), niobium (Nb), aluminum (Al), magnesium (Mg), tin (Sn), indium (In), lead (Pb), an alloy thereof, a combination thereof, or a combination thereof with copper (Cu); and (B) multiple graphene sheets that are dispersed in the matrix material, wherein the multiple graphene sheets are substantially aligned to be parallel to one another and are in an amount from 0.1% to 95% by volume based on the total nanocomposite volume; wherein the multiple graphene sheets contain single-layer or few-layer graphene sheets selected from a pristine graphene material having essentially zero % of non-carbon elements, or a non-pristine graphene material having 0.001% to 25% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein the chemically functionalized graphene is not graphene oxide. Preferably, in the above-cited embodiments, the graphene sheets are in an amount from 10% to 95% by volume and graphene sheets are spaced by the matrix material having an average spacing from 1 nm to 300 nm.

In some embodiments, the disclosure provides a metal matrix nanocomposite comprising: (A) a metal or metal alloy as a matrix material, wherein the metal or metal alloy contains copper (Cu), a Cu alloy, or a combination thereof with aluminum (Al), magnesium (Mg), tin (Sn), indium (In), lead (Pb), or a transition metal; (B) multiple graphene sheets that are dispersed in the matrix material, wherein the multiple graphene sheets are substantially aligned to be parallel to one another and are in an amount from 0.1% to 95% by volume based on the total nanocomposite volume; wherein the multiple graphene sheets contain single-layer or few-layer graphene sheets selected from a pristine graphene material having essentially zero % of non-carbon elements, or a non-pristine graphene material having 0.001% to 25% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein the chemically functionalized graphene is not graphene oxide and the graphene sheets are spaced by the matrix material having an average spacing from 1 nm to 300 nm. Preferably, the graphene sheets are in an amount from 10% to 95% by volume. Preferably, the transition metal is selected from silver (Ag), gold (Au), copper (Cu), platinum (Pt), zinc (Zn), cadmium (Cd), titanium (Ti), vanadium (V), cobalt (Co), nickel (Ni), manganese (Mn), iron (Fe), molybdenum (Mo), tungsten (W), niobium (Nb), an alloy thereof, or a combination thereof.

In all the aforementioned embodiments, the graphene sheets are preferably in an amount from 20% to 95% by volume and graphene sheets are spaced by the matrix material having an average spacing from 1 nm to 150 nm. Further preferably, the graphene sheets are in an amount from 40% to 95% by volume and graphene sheets are spaced by the matrix material having an average spacing from 1 nm to 70 nm. Still further preferably, the graphene sheets are in an amount from 75% to 95% by volume and the graphene sheets are spaced by the matrix material having an average spacing from 1 nm to 30 nm.

In certain preferred embodiments, the graphene sheets contain mostly single-layer graphene (90% to 100%) having an average number of layers between 1 and 2. In certain embodiments, the graphene sheets contain single-layer graphene and few-layer graphene sheets having an average number of layers less than 5. Few-layer graphene is commonly defined as those graphene sheets having 2-10 layers of graphene planes.

In some highly useful embodiments, the nanocomposite is in a thin film form having a thickness from 5 nm to 500 μm and the graphene sheets are substantially aligned parallel to a thin film plane. In some preferred embodiments, the nanocomposite is in a thin film form having a thickness from 10 nm to 100 μm and graphene sheets being aligned parallel to a thin film plane.

Typically, the disclosed metal matrix nanocomposite has a tensile strength no less than 350 MPa, a tensile modulus no less than 75 GPa, a thermal conductivity no less than 1,000 W/mK, and/or an electrical conductivity no less than 5,000 S/cm, all measured along a thin film plane direction. Typically and preferably, the metal matrix nanocomposite has a tensile strength no less than 500 MPa, a tensile modulus no less than 150 GPa, a thermal conductivity no less than 1,200

W/mK, and/or an electrical conductivity no less than 8,000 S/cm, all measured along a thin film plane direction. In many cases, the metal matrix nanocomposite has a tensile strength no less than 700 MPa, a tensile modulus no less than 250 GPa, a thermal conductivity no less than 1,500 W/mK, and/or an electrical conductivity no less than 12,000 S/cm, all measured along a thin film plane direction. Some of the disclosed metal matrix nanocomposites exhibit a tensile strength no less than 800 MPa, a tensile modulus no less than 350 GPa, a thermal conductivity no less than 1,600 W/mK, and/or an electrical conductivity no less than 20,000 S/cm, all measured along a thin film plane direction.

Typically, the disclosed metal matrix nanocomposite exhibits a Vickers hardness value from 70 to 400 HV.

The chemically functionalized graphene sheets are preferably those exhibiting a negative Zeta potential in a given dispersion, typically in the range from −55 mV to −0.1 mV. These functionalized graphene sheets typically have a functional group that is attached to these sheets for imparting negative Zeta potential thereto. Zeta potential is the potential difference between the dispersion medium and the stationary layer of fluid attached to the dispersed particles (e.g. graphene sheets) dispersed in this dispersion medium (e.g. water, organic solvent, electrolyte etc.). Several commercially available instruments (e.g. Zetasizer Nano from Malvern Panalytical and SZ-100 from Horiba Scientific) can be used to measure the Zeta potential of different types of graphene sheets in different dispersion mediums.

It may be noted that a given type of graphene (e.g. graphene oxide or reduced graphene oxide) can exhibit a positive or negative Zeta potential and its value can vary, depending upon the chemical functional groups attached to graphene sheets and the dispersion medium used. Unless otherwise specified, the Zeta potential values provided are for the graphene sheets dispersed in an aqueous solution having a pH vale of 5.0-9.0 (mostly 7.0).

In some embodiments, the chemically functionalized graphene sheets contain a chemical functional group selected from alkyl or aryl silane, alkyl or aralkyl group, hydroxyl group, carboxyl group, amine group, sulfonate group (—SO₃H), aldehydic group, quinoidal, fluorocarbon, or a combination thereof. Alternatively, the functional group contains a derivative of an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

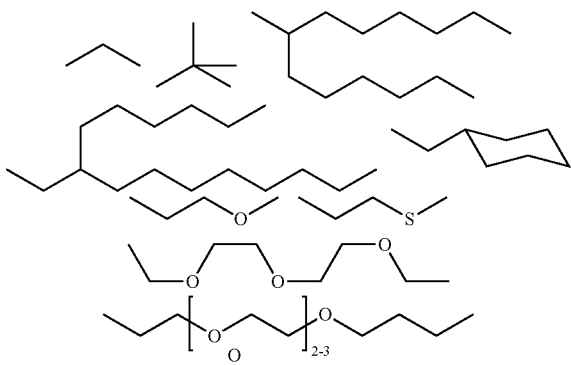

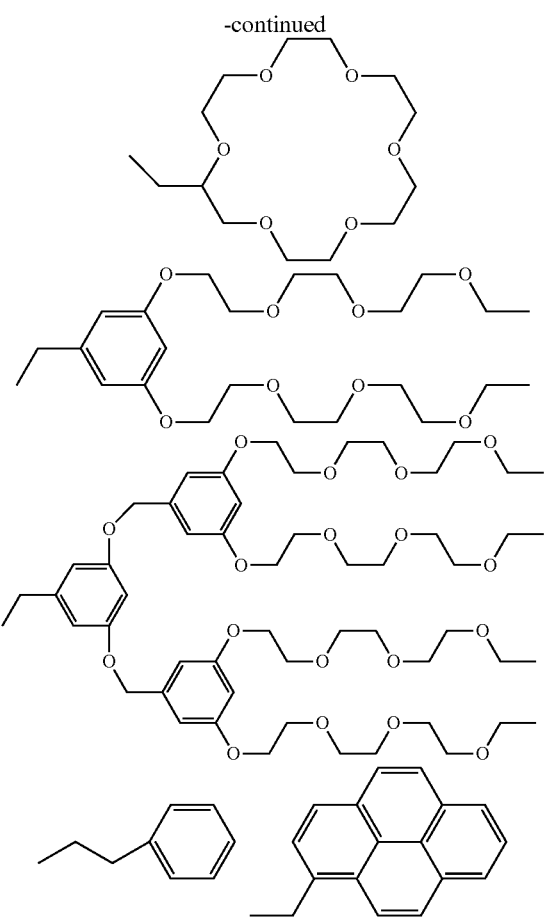

and combinations thereof.

In certain embodiments, the functional group is selected from the group consisting of hydroxyl, peroxide, ether, keto, and aldehyde. In certain embodiments, the functionalizing agent contains a functional group selected from the group consisting of SO₃H, COOH, NH₂, OH, R'CHOH, CHO, CN, COCl, halide, COSH, SH, COOR', SR', SiR'₃, Si(—OR'—)$_y$R'$_{3-y}$, Si(—O—SiR'₂—)OR', R'', Li, AlR'₂, Hg—X, TlZ₂ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

The functional group may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

In some embodiments, the functional group may be selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'₂, R'SH, R'CHO, R'CN, R'X, R'N⁺(R')₃X⁻, R'SiR'₃, R'Si(—OR'—)$_y$R'$_{3-y}$, R'Si(—O—SiR'₂—)

OR', R'—R", R'—N—CO, $(C_2H_4O—)_wH$, $(—C_3H_6O—)_wH$, $(—C_2H_4O)_w—R'$, $(C_3H_6O)_w—R'$, R', and w is an integer greater than one and less than 200.

The preparation of graphene sheets and graphene dispersions is described as follows: Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nanographite material.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Patent Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Patent Pub. No. 2008-0048152).

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nanographene platelets (NGPs) or graphene materials. NGPs include pristine graphene (essentially 99% of carbon atoms), slightly oxidized graphene 5% by weight of oxygen), graphene oxide (≥5% by weight of oxygen), slightly fluorinated graphene 5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nanofiller in a composite material and an electrode material in energy storage devices is imminent. The availability of processable graphene sheets in large quantities is essential to the success in exploiting composite, energy, and other applications for graphene.

A highly useful approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nanofiber, carbon nanotube, mesophase carbon microbead (MCMB) or carbonaceous microsphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. $Na_4B$) may be added to obtain reduced graphene oxide (RDO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets were, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon microbead (MCMB) or carbonaceous microsphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently disclosed graphene can contain pristine or non-pristine graphene and the disclosed method allows for this flexibility. These graphene sheets all can be chemically functionalized.

Graphene sheets have a significant proportion of edges that correspond to the edge planes of graphite crystals. The carbon atoms at the edge planes are reactive and must contain some heteroatom or group to satisfy carbon valency. Further, there are many types of functional groups (e.g. hydroxyl and carboxylic) that are naturally present at the edge or surface of graphene sheets produced through chemical or electrochemical methods. Many chemical function groups (e.g. —$NH_2$, etc.) can be readily imparted to graphene edges and/or surfaces using methods that are well-known in the art.

The functionalized NGPs of the instant disclosure can be directly prepared by sulfonation, electrophilic addition to deoxygenated graphene platelet surfaces, or metallization. The graphene platelets can be processed prior to being contacted with a functionalizing agent. Such processing may include dispersing the graphene platelets in a solvent. In some instances, the platelets or may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphene sheets or platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O— or NH— leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 86, 1839 (1964), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

The disclosure also provides a process for producing the aforementioned metal matrix nanocomposite. In certain embodiments, the process comprises:
(a) depositing a thin layer of a metal on surfaces of multiple graphene sheets having a lateral dimension (length, width, or diameter) from 5 nm to 100 μm to produce multiple metal-coated graphene sheets (excluding the long and wide pristine graphene film produced from catalytic chemical vapor deposition or CVD that is typically several centimeters wide, and often up to several meters wide);
(b) aligning or orientating the metal-coated graphene sheets along a desired direction; and
(c) consolidating these metal-coated graphene sheets into a metal matrix nanocomposite having graphene sheets substantially oriented parallel to one another.

This process can produce a nanocomposite in a "bricks and mortar" nanostructure having nanoscaled bricks (graphene sheets) being spaced by mortar (metal matrix) with an average spacing typically smaller than 1 μm, more typically smaller than 300 nm, further more typically smaller than 100 nm, and most desirably smaller than 10 nm (the spacing can be as small as 0.5 nm).

Step (a) typically begins with a step of producing isolated graphene sheets via chemical oxidation/intercalation of graphite, liquid phase exfoliation of graphite, electrochemical exfoliation of graphite, supercritical fluid exfoliation of graphite, or high-shear exfoliation of graphite, etc. These processes typically result in the formation of isolated, discrete graphene sheets that have a lateral dimension from 5 nm to 100 μm and a thickness from one atomic carbon plane of hexagonal carbon atoms (single-layer graphene, as small as 0.34 nm) to 10 hexagonal planes (2-10 planes, or few-layer graphene).

In step (a), one or both primary surfaces of a graphene sheet can be deposited with a thin layer of metal via sputtering, physical vapor deposition, chemical vapor deposition, electrochemical deposition (electroplating), chemical plating (e.g. electroless plating, electrophoretic deposition, etc.

Electroplating of a plurality of isolated graphene sheets may be conducted by confining these graphene sheets in a porous cage (e.g. metal wire cage), which is immersed in an electrochemical electrolyte (e.g. $CuSO_4$ dissolved in water) of an electrochemical reactor chamber. A current is imposed between this working electrode and a counter-electrode (e.g. a piece of Cu) until a desired thickness of metal (e.g. Cu) is plated onto graphene sheet surfaces.

For electroless plating, graphene oxide (GO) sheets may be employed as template and hydrazine hydrate as a reducing agent for both GO and cupric ions. Copper-coated reduced graphene oxide (RGO) may be fabricated by the ultrasound-assisted electroless copper plating process. A uniform Cu layer can be coated onto each of the two sides (primary surfaces) of an RGO sheet without using an externally applied voltage. The Cu layer thickness may be readily varied between 1 nm and 200 nm.

Preferably, the process further contains, prior to step (a), a step of chemically functionalizing the graphene sheets (pristine graphene, graphene oxide, reduced graphene oxide, fluorinated graphene, nitrogenated graphene, etc.) so that the graphene sheets exhibit a negative Zeta potential preferably from −55 mV to −0.1 mV in a desired solution. This Zeta potential can promote attraction of metal ions to graphene surfaces.

In certain embodiments, the process further comprises, prior to step (a), a step of subjecting the graphene surface to an activation treatment, an etching treatment, or a combination thereof. In some embodiments, step (a) includes a step of subjecting the graphene sheet surfaces to an etching treatment using an etchant selected from an acid, an oxidizer, a metal salt, or a combination thereof.

Preferably, the process further comprises, prior to step (a), a step of subjecting the graphene sheet surfaces to an etching treatment without using chromic acid or chromosulfuric acid. More preferably, the process further comprises, prior to step (a), a step of subjecting the graphene sheets to an etching treatment using an etchant selected from an acid, an oxidizer, a metal salt, or a combination thereof under a mild etching condition wherein etching is conducted at a sufficiently low temperature for a sufficiently short period of time so as not to create micro-caverns having an average size greater than 0.1 μm.

In step (b), alignment of metal-coated graphene sheets can be achieved through a forced assembly approach that are schematically illustrated in FIG. 3(A), FIG. 3(B), FIG. 3(C), and FIG. 3(D).

In some desired embodiments, the forced assembly procedure includes introducing a dispersion of metal-coated graphene sheets (also referred to as a metal-coated graphene dispersion), having an initial volume $V_1$, in a mold cavity cell and driving a piston into the mold cavity cell to reduce the metal-coated graphene dispersion volume to a smaller value $V_2$, allowing most of the remaining dispersion liquid or electrolyte to flow out of the cavity cell (e.g. through holes of the mold cavity cell or of the piston) and aligning the multiple metal-coated graphene sheets along a direction at an angle from 0° to 90° relative to a movement direction of said piston.

Figure 3A:
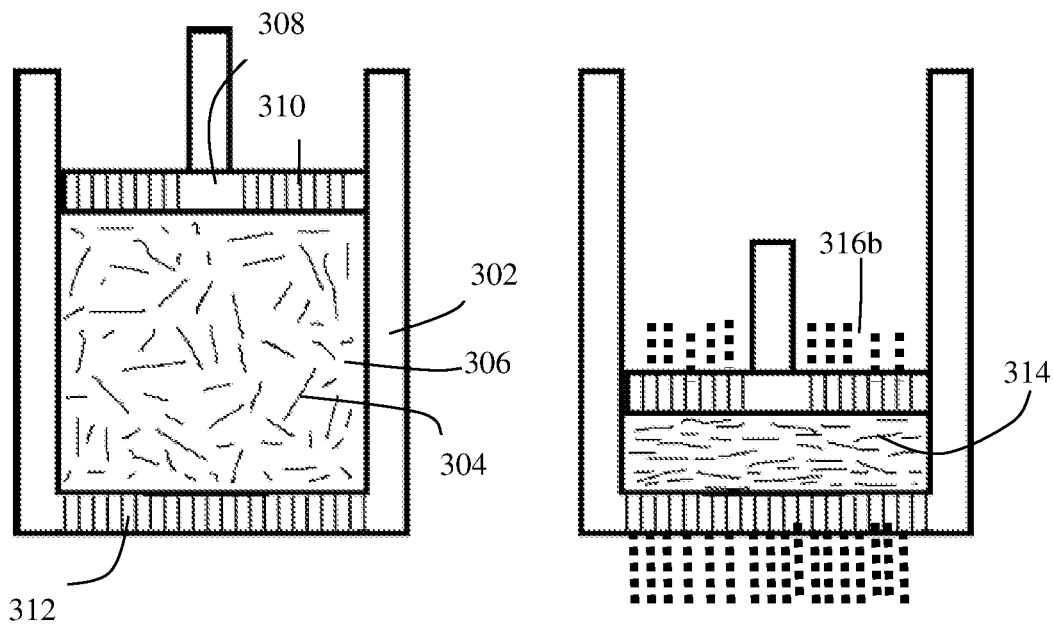
FIG. 3(A) Schematic drawing to illustrate an example of a compressing and consolidating operation (using a mold cavity cell equipped with a piston or ram) for forming a layer of highly compacted and oriented metal-covered graphene sheets, which are aligned parallel to the bottom plane or perpendicular to the layer thickness direction.

FIG. 3(A) provides a schematic drawing to illustrate an example of a compressing and consolidating operation (using a mold cavity cell 302 equipped with a piston or ram 308) for forming a layer of highly compacted and oriented metal-coated graphene sheets 314. Contained in the chamber (mold cavity cell 302) is a dispersion (e.g. suspension or slurry that is composed of metal-coated graphene sheets 304 randomly dispersed in a liquid or electrolyte 306). As the piston 308 is driven downward, the volume of the dispersion is decreased by forcing liquid to flow through minute channels 312 on a mold wall or through small channels 310 of the piston. These small channels can be present in any or all walls of the mold cavity and the channel sizes can be designed to permit permeation of the liquid, but not the solid metal-coated graphene sheets (typically 0.05-100 μm in length or width). The liquid is shown as 316a and 316b on the right diagram of FIG. 3(A). As a result of this compressing and consolidating operation, metal-coated graphene sheets 314 are aligned parallel to the bottom plane or perpendicular to the layer thickness direction.

Figure 3B:
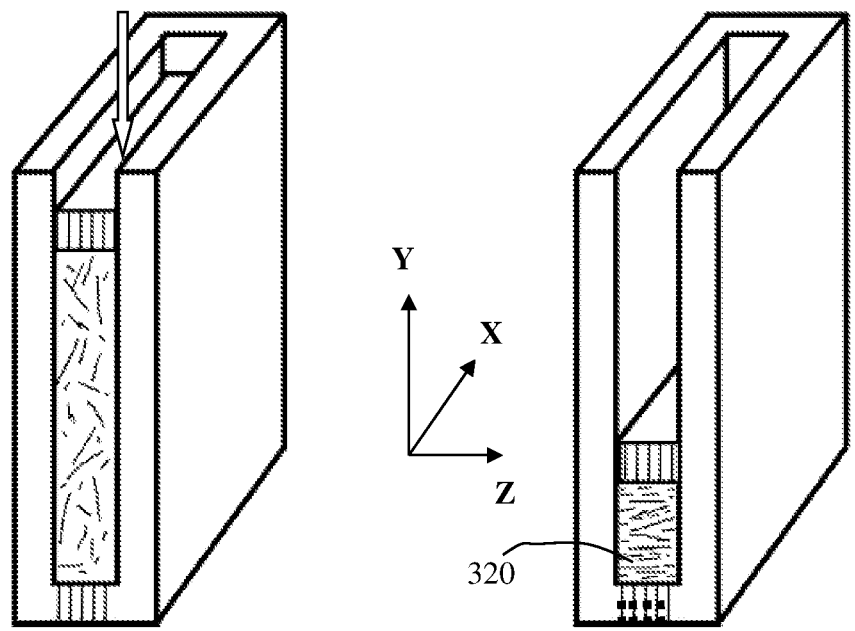
FIG. 3(B) Schematic drawing to illustrate another example of a compressing and consolidating operation (using a mold cavity cell equipped with a piston or ram) for forming a layer of highly compacted and oriented metal-covered graphene sheets, which are aligned perpendicular to the side plane (X-Y plane) or parallel to the layer thickness direction (Z direction).

Shown in FIG. 3(B) is a schematic drawing to illustrate another example of a compressing and consolidating operation (using a mold cavity cell equipped with a piston or ram) for forming a layer of highly compacted and oriented metal-coated graphene sheets 320. The piston is driven downward along the Y-direction. The metal-coated graphene sheets are aligned on the X-Z plane and perpendicular to X-Y plane (along the Z- or thickness direction). This layer of oriented metal-coated graphene sheets can be attached to a supporting substrate that is basically represented by the X-Y plane. In the resulting electrode, metal-coated graphene sheets are aligned perpendicular to the substrate.

Figure 3C:
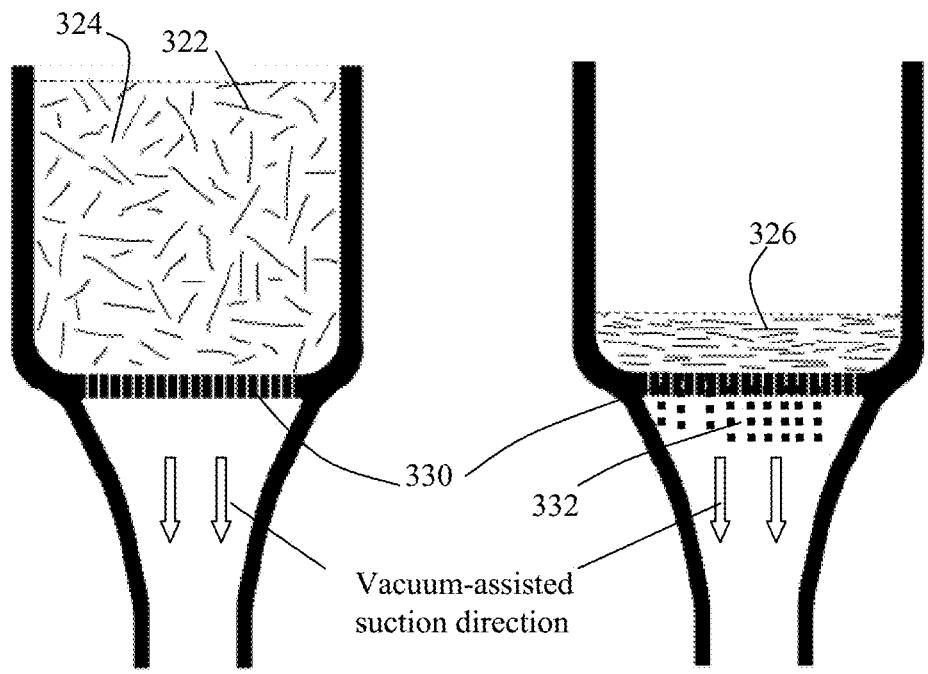
FIG. 3(C) Schematic drawing to illustrate yet another example of a compressing and consolidating operation (using a mold cavity cell with a vacuum-assisted suction provision) for forming a layer of highly compacted and oriented metal-covered graphene sheets, which are aligned parallel to the bottom plane or perpendicular to the layer thickness direction. Preferably, the resulting layer of electrolyte-impregnated laminar graphite flake structure is further compressed to achieve an even high tap density.

FIG. 3(C) provides a schematic drawing to illustrate yet another example of a compressing and consolidating operation (using a mold cavity cell with a vacuum-assisted suction provision) for forming a layer of highly compacted and oriented metal-coated graphene sheets 326. The process begins with dispersing isolated metal-coated graphene sheets 322 and an optional conductive filler in a liquid 324 to form a dispersion. This is followed by generating a negative pressure via a vacuum system that sucks liquid 332 through channels 330. This compressing and consolidating operation acts to reduce the dispersion volume and align all the isolated metal-coated graphene sheets on the bottom plane of a mold cavity cell. Compacted metal-coated graphene sheets are aligned parallel to the bottom plane or perpendicular to the layer thickness direction. Preferably, the resulting layer of metal-coated graphene sheet structure is further compressed to achieve an even high tap density.

Thus, in some desired embodiments, the forced assembly procedure includes introducing a dispersion of metal-coated graphene sheets in a mold cavity cell having an initial volume $V_1$, and applying a suction pressure through a porous wall of the mold cavity to reduce the dispersion volume to a smaller value $V_2$, allowing liquid to flow out of the cavity cell through the porous wall and aligning the multiple metal-coated graphene sheets along a direction at an angle from approximately 0° to approximately 90° relative to a suction pressure direction; this angle depending upon the inclination of the bottom plane with respect to the suction direction.

Figure 3D:
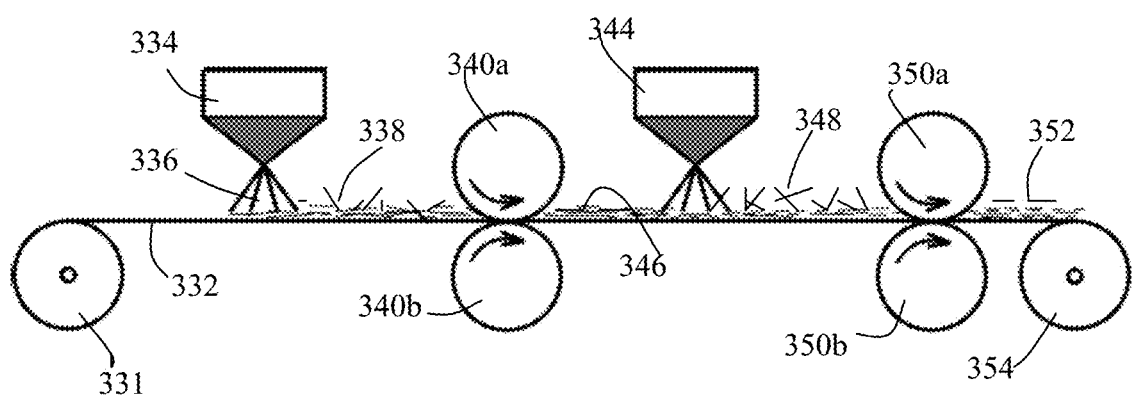
FIG. 3(D) A roll-to-roll process for producing a layer of metal-covered graphene sheets that are well-aligned on the supporting substrate plane.

FIG. 3(D) shows a roll-to-roll process for producing a thick layer of metal-coated graphene sheets. This process begins by feeding a continuous solid substrate 332 (e.g. PET film or stainless steel sheet) from a feeder roller 331. A dispenser 334 is operated to dispense a dispersion 336 of isolated metal-coated graphene sheets onto the substrate surface to form a layer of deposited dispersion 338, which feeds through the gap between two compressing rollers, 340a and 340b, to form a layer of highly oriented metal-coated graphene sheets. The metal-coated graphene sheets are well-aligned on the supporting substrate plane. If so desired, a second dispenser 344 is then operated to dispense another layer of dispersion 348 on the surface of the previously consolidated dispersion layer. The two-layer structure is then driven to pass through the gap between two roll-pressing rollers 350a and 350b to form a thicker layer 352 of metal-coated graphene sheets, which is taken up by a winding roller 354.

Thus, in some preferred embodiments, the forced assembly procedure includes introducing a first layer of the metal-coated graphene sheets dispersion onto a surface of a supporting conveyor and driving the layer of metal-coated graphene sheets suspension supported on the conveyor through at least a pair of pressing rollers to reduce the thickness of the metal-coated graphene sheets dispersion layer and align the multiple metal-coated graphene sheets along a direction parallel to the conveyor surface for forming a layer of metal-coated graphene sheets.

The process may further include a step of introducing a second layer of the metal-coated graphene sheets dispersion onto a surface of the layer of metal-coated graphene sheets structure to form a two layer structure, and driving the two-layer structure through at least a pair of pressing rollers to reduce a thickness of the second layer of metal-coated graphene sheets dispersion and align the multiple metal-coated graphene sheets along a direction parallel to the conveyor surface for forming a layer of metal-coated graphene sheets. The same procedure may be repeated by allowing the conveyor to move toward a third set of pressing rollers, depositing additional (third) layer of metal-coated graphene sheets dispersion onto the two-layer structure, and forcing the resulting 3-layer structure to go through the gap between the two rollers in the third set to form a further compacted structure of metal-coated graphene sheets.

The above paragraphs about FIG. 3(A)-FIG. 3(D) are but four of the many examples of possibly apparatus or processes that can be used to produce compact strictures that contain highly oriented and closely packed metal-coated graphene sheets.

The disclosure also provides an alternative procedure to obtain aligned metal-coated graphene sheets that are bonded on a primary surface of a polymer film. This procedure comprises:

(A) Feeding a continuous polymer film from a polymer film feeder into a graphene deposition chamber, wherein the graphene deposition chamber accommodates a graphene dispersion comprising multiple discrete graphene sheets dispersed in a liquid adhesive resin (e.g. uncured monomer and a curing agent, plus an optional diluent liquid, such as water or organic solvent);

(B) Operating the graphene deposition chamber to deposit the graphene sheets and the adhesive resin to at least a primary surface of the polymer film for forming a graphene-coated or graphene-bonded polymer film;

(C) Moving the graphene-coated film into a metallization chamber which accommodates a plating solution for plating a layer of a desired metal onto the graphene-coated polymer film to obtain a surface-metalized polymer film; and (D) Operating a winding roller to collect the surface-metalized polymer film;

wherein the multiple graphene sheets contain single-layer or few-layer graphene sheets selected from a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof. One or both primary surfaces of a polymer films may be metallized in this process wherein a surface is deposited with aligned graphene sheets that are in turn covered with a thin layer of metal. The plating solution may contain an electroless chemical plating solution, an electrochemical plating solution, or an electrophoretic solution.

Step (C) may contain immersing the polymer film in a metallizing bath to accomplish chemical plating or electroless plating. The high electrical conductivity of deposited graphene sheets enables plating of metal layer(s) on graphene-coated polymer film surfaces. Alternatively, one may choose to use physical vapor deposition, sputtering, plasma deposition, etc. to accomplish the final metallization procedure.

In the disclosed method, step (C) may contain immersing the graphene-bonded polymer component in a metallizing bath. The high electrical conductivity of deposited graphene sheets readily enables electro-plating of metal layer(s) on graphene-coated polymer component surfaces.

Alternatively and advantageously, the final metallization step may be accomplished by using a chemical plating method without using an expensive noble metal solution. This step can include dipping (immersing) a graphene/conductive filler-coated polymer component in a chemical plating bath which contains a metal salt (salt of an intended metal, such as Cu, Ni, or Co) dissolved in a liquid medium (e.g. $CuSO_4$ in water or $NiNO_3$ in water). Such a dipping procedure typically requires a contact time from 3 seconds to 30 minutes.

A copper metal plating bath (or Ni plating bath) may comprise a copper salt (or Ni salt) and an additive consumption-inhibiting compound. The additive consumption-inhibiting compound may comprise methyl sulfoxide, methyl sulfone, tetramethylene sulfoxide, thioglycolic acid, 2 (5H) thiophenone, 1,4-dithiane, trans-1,2-dithiane, tetrahydrothiophene-3-one, 3-thiophenemethanol, 1,3,5-trithiane, 3-thiopheneacetic acid, thiotetronic acid, crown thioethers, tetrapyrids, dipropyltrisulfide, bis(3-triethoxy silyl propyltetrasulfide, dimethyl tetrasulfide, methyl methanethiosulfate, (2-sulfonatoethyl) methane, p-tolyldisulfoxide, p-tolyldisulfone, bis(phenylsulfonyl)sulfide, 4-(chlorosulfonyl) benzoic acid, isopropyl sulfonyl chloride, 1-propane sulfonyl chloride, thioctic acid, 4-hydroxy-benzene sulfonic acid, phenyl vinyl sulfone, or mixtures thereof.

Alternatively, one may choose to use physical vapor deposition, sputtering, plasma deposition, etc. to accomplish the final metallization procedure.

Also alternatively, steps (A) and (B) may be replaced by a step of spraying a mixture or dispersion of graphene sheets in an adhesive resin onto a primary surface or both primary surfaces of a polymer film and then drying (if a liquid solvent or water is present) and curing/polymerizing the adhesive resin. Several well-known spraying techniques may be used for this function, such as ultrasonic spraying and air pressure-assisted spraying.

The process may further comprise operating a drying, heating, or curing means to partially or completely remove the liquid medium (if present) from the graphene-coated polymer film and to polymerize or cure the adhesive resin for producing the graphene-coated polymer film containing the multiple graphene sheets that are bonded to the at least a primary surface or both primary surfaces of the polymer film.

The adhesive may be a "tentative" adhesive that allows for easy peeling-off of the layer of metal-covered graphene sheets from the polymer film. Otherwise, the supporting polymer film may be dissolved by using a solvent or may be burnt off, leaving behind the layer of metal-covered graphene sheets. Smaller pieces may be cut and slit from this layer of metal-covered graphene sheets, stacked together, and then subjected to a consolidation treatment (e.g. by melting the metal, compacting the structure and the solidifying the structure to form a metal matrix nanocomposite or by sintering).

The adhesive resin composition includes an adhesive resin as a main ingredient and may also include a curing agent and a coupling agent. Examples of the adhesive resin may include an ester resin, a urethane resin, a urethane ester resin, an acrylic resin, and an acrylic urethane resin, specifically ester resins including neopentyl glycol (NPG), ethylene glycol (EG), isophthalic acid, and terephthalic acid. The curing agent may be present in an amount of 1 to 30 parts by weight based on 100 parts by weight of the adhesive resin. The coupling agent may include epoxy silane compounds.

Curing of this adhesive layer may be conducted via heat, UV, or ionizing radiation. This can involve heating the layers coated with the heat-curable composition to a temperature of at least 70° C., preferably of 90° C. to 150° C., for at least 1 minute (typically up to 2 hours and more typically from 2 minutes to 30 minutes), so as to form a hard coating layer.

The polymer component surfaces may be brought to be in contact with the graphene or CNT dispersion using dipping, coating (e.g. doctor-blade coating, bar coating, slot-die coating, comma coating, reversed-roll coating, etc.), roll-to-roll process, inkjet printing, screen printing, micro-contact, gravure coating, spray coating, ultrasonic spray coating, electrostatic spray coating, and flexographic printing. The thickness of the hard coat or adhesive layer is generally about 1 nm to 10 μm, preferably 10 nm to 2 μm.

For thermally curable resins, the polyfunctional epoxy monomer may be selected preferably from digylcerol tetraglycidyl ether, dipentaerythritol tetraglycidyl ether, sorbitol polyglycidyl ether, polyglycerol polyglycidyl ether, pentaerythritol polyglycidyl ether (e.g. pentaerythritol tetraglycidyl ether), or a combination thereof. The bi- or tri-functional epoxy monomer can be selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate and mixtures.

In certain embodiments, the heat-curable compositions of the present disclosure advantageously further contain small amounts, preferably from 0.05 to 0.20% by weight, of at least one surface active compound. The surface active agent is important for good wetting of the substrate resulting in satisfactory final hard-coating.

The UV radiation curable resins and lacquers usable for the adhesive layer useful in this disclosure are those derived from photo polymerizable monomers and oligomers, such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin.

The UV polymerizable monomers and oligomers are coated (e.g. after retreating from dipping) and dried, and subsequently exposed to UV radiation to form an optically clear cross-linked abrasion resistant layer. The preferred UV cure dosage is between 50 and 1000 mJ/cm$^2$.

UV-curable resins are typically ionizing radiation-curable as well. The ionizing radiation-curable resins may contain a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

In certain embodiments, the graphene dispersion contains an adhesive resin having an adhesive-to-graphene weight ratio from 1/5000 to 1/10.

Figure 4:
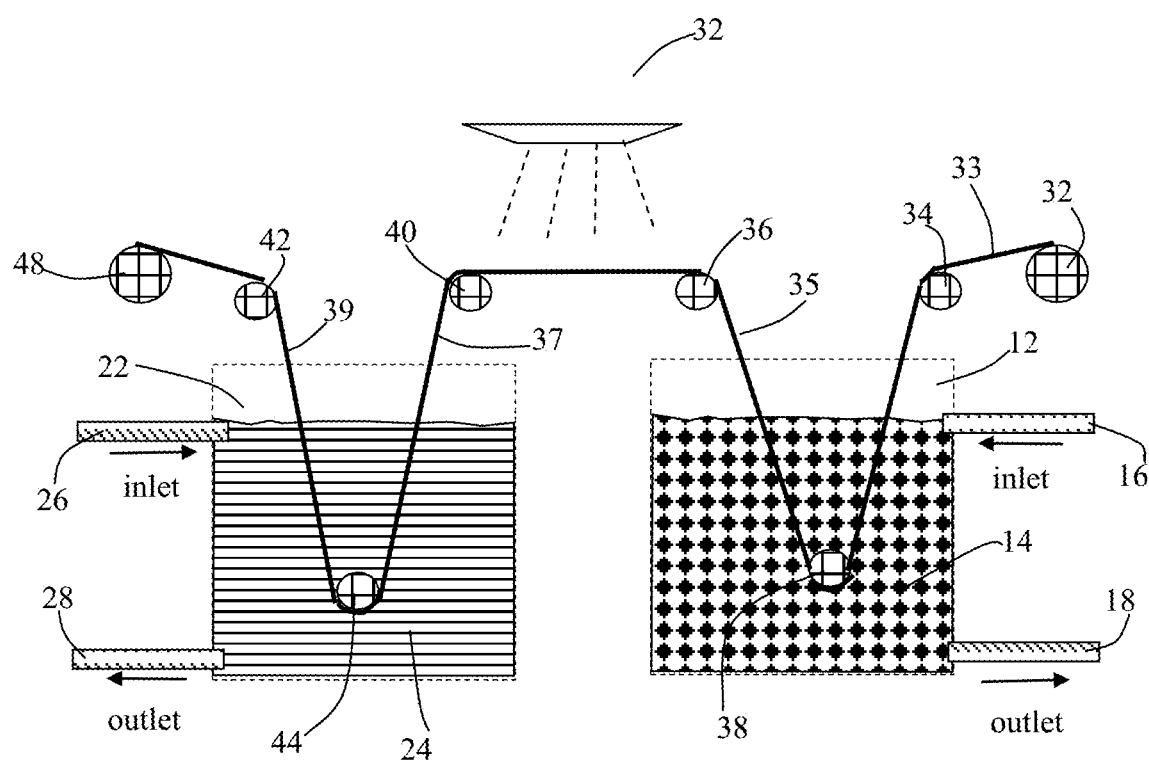
FIG. 4 Schematic of a system for producing metal-covered graphene sheets supported by a continuous polymer film.

The present disclosure also provides an apparatus and the associated process that can be used to produce the surface-metallized polymer film containing metal-covered layer of graphene sheets deposited on a polymer film surface. In certain embodiments, as illustrated in FIG. 4, the apparatus may comprise a film feeder roller 32 that feeds a polymer film 33 (with or without a supporting substrate) into a graphene deposition chamber (e.g. a graphene dispersion bath 12) that accommodates a graphene dispersion 14 comprising multiple graphene sheets and an optional conducive filler dispersed in a first liquid medium and an adhesive resin dissolved in the first liquid medium. Guiding rollers or rods (e.g. 34, 38, 36) are used to guide the movement of the polymer film 33. The polymer film is moved to immerse into the graphene dispersion 14 contained in the graphene deposition chamber 12. The graphene deposition chamber 12 is operated to deposit the graphene sheets and optional conductive filler to at least a primary surface of a polymer film for forming a graphene-coated polymer film (e.g. 35). The graphene-coated, graphene-deposited or graphene-covered polymer film is then moved to enter a heating/drying/curing zone (e.g. underneath a heating/drying/curing device 32), allowing the graphene sheets and the optional conductive filler to get coated on or bonded to at least a primary surface of the polymer film, thereby forming a graphene-coated polymer film 37.

With the assistance of the guiding rollers/rods 40, 44, 42, the graphene-coated polymer film 37 is guided to move into a metallization chamber (e.g. a metal plating bath 22), disposed nearby the graphene dispersion bath 12, which accommodates a plating solution 24 for plating a layer of a desired metal on the at least one primary surface of a graphene-coated polymer film to obtain the surface-metalized polymer film 39. The metallized polymer film is then wound on a winding roller 48 (take-up roller). It may be noted that both primary surfaces of a polymer film would be metallized if both surfaces of the polymer film are not covered by a sheet of paper or plastic. Only one primary surface is metallized if the other primary surface is covered, preventing the graphene solution from contacting this surface.

Preferably, the graphene deposition chamber 12 has an inlet 16 through which fresh graphene dispersion may be pumped into the graphene deposition chamber and an outlet 18 through which spent graphene dispersion may be pumped out, respectively. Further preferably, the metallization chamber 22 has an inlet 26 through which fresh plating solution may be pumped into the metallization chamber and an outlet 28 through which spent plating solution may be pumped out, respectively.

The apparatus may further comprise a drying, heating, or curing provision 32 in a working relation with the graphene deposition chamber (e.g. above and between the graphene dispersion bath and the metallization chamber) for partially or completely removing the first liquid medium from the at least a graphene-coated polymer film and/or for polymerizing or curing the optional adhesive resin for producing the at least a graphene-coated polymer film containing multiple graphene sheets that are bonded to a primary surface of the polymer film.

In the apparatus, the plating solution 24 may contain a chemical plating solution, an electrochemical plating solution, or an electrophoretic solution. Preferably, the plating solution contains a chemical plating solution comprising a metal salt dissolved in water or an organic solvent (e.g. $CuSO_4$ or $NiNO_3$ dissolved in water for Cu plating or Ni plating). The various graphene sheets bonded on a polymer component surface are surprisingly capable of attracting metal ions to the graphene-covered or graphene-coated polymer film surface.

The operation of the aforementioned procedures may be conducted in a continuous or intermittent manner and can be fully automated. The metal thickness relative to the graphene sheet thickness can be readily controlled to meet a desired need (e.g. by varying the deposition time and/or the electroplating current and time).

The polymer film may contain a plastic, a rubber, a thermoplastic elastomer, a polymer matrix composite, a rubber matrix composite, or a combination thereof. In certain embodiments, the polymer film contains a thermoplastic, a thermoset resin, an interpenetrating network, a rubber, a thermoplastic elastomer, a natural polymer, or a combination thereof. In certain preferred embodiments, the polymer film contains a plastic selected from acrylonitrile-butadiene-styrene copolymer (ABS), styrene-acrylonitrile copolymer (SAN), polycarbonate, polyamide or nylon, polystyrene, polyacrylate, polyethylene, polypropylene, polyacetal, polyester, polyether, polyether sulfone, poly ether ether ketone (PEEK), poly sulfone, polyphenylene oxide (PPO), polyvinyl chloride (PVC), polyimide, polyamide imide, polyurethane, polyurea, or a combination thereof.

In the surface-metalized polymer article, the plated metal is preferably selected from copper, nickel, aluminum, chromium, tin, zinc, titanium, silver, gold, an alloy thereof, or a combination thereof.

The supporting polymer film may be dissolved by using a solvent or may be burnt off, leaving behind the layer of metal-covered graphene sheets. The free-standing layer of metal-covered graphene sheets or the layer of metal-covered graphene sheets supported on a polymer film may be cut and slit to produce smaller pieces of desired shapes and dimensions. These smaller pieces may then be stacked together and then subjected to a consolidation treatment to form a metal matrix nanocomposites (e.g. by melting the metal, compacting the structure and the solidifying the structure to form a metal matrix nanocomposite or by sintering).

The following examples are used to illustrate some specific details about the best modes of practicing the instant disclosure and should not be construed as limiting the scope of the disclosure. The tensile and compressive properties, thermal conductivity, and electrical conductivity of the nanocomposites were measured by following well-known standard procedures.

Example 1: Graphene Oxide from Sulfuric Acid Intercalation and Exfoliation of MCMBs MCMB (mesocarbon microbeads) were supplied by China Steel Chemical Co. This material has a density of about 2.24 g/cm$^3$ with a median particle size of about 16 µm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene sheets. A quantity of graphene sheets was mixed with water and ultrasonicated at 60-W power for 10 minutes to obtain a graphene dispersion.

A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Several graphene dispersions were separately added with a variety of adhesive resins (e.g. epoxy- and urethane-based) for use in the graphene deposition procedure of polymer films.

Example 2: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting suspension was subjected to ultrasonication for a period of 15 minutes to obtain dispersion of graphene oxide (GO) sheets.

Example 3: Preparation of Pristine Graphene

Pristine graphene sheets were produced by using the direct ultrasonication or liquid-phase exfoliation process. In a typical procedure, five grams of graphite flakes, ground to approximately 20 µm in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free.

Examples 4: Preparation of Graphene Fluoride

Several processes have been used by us to produce GF, but only one process is herein described as an example. In a typical procedure, highly exfoliated graphite (HEG) was prepared from intercalated compound $C_2F.xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions.

Example 5: Preparation of Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

Example 6: Ni-Coated Pristine Graphene Sheets

The graphene sheets with a multilayer structure (a thickness of 2-3 nm and a lateral dimension of 1.5 μm) were obtained using GO prepared in Example 2 as the source material through the reduction with hydrazine hydrate and were dispersed in the plating solution. The Ni plating solution consisted of $NiSO_4.7H2O$ (300 g/L), $NiCl_2 \cdot 6H_2O$ (35 g/L), $H_3BO_3$ (40 g/L) and a surfactant (sodium dodecylsulfate, SDS, 0.5 g/L). After the Ni plating solution was prepared, graphene sheets of 0.05 g/L were added in the solution. Electroless plating was allowed to occur for 30-60 minutes.

For electroplating, a steel wire cage containing graphene sheets were used as the cathode (working electrode), and a Ni plate was used as the anode (counter-electrode). The plating was performed at 50° C. with the current density varying from 0.15 to 4 $A/dm^2$ for 10-50 minutes.

The resulting Ni-coated graphene sheets were made into layers of oriented Ni-coated graphene sheets using the vacuum-assisted filtration procedure illustrated in FIG. 3(C). These layers were then dried and run through a pair of pressing rollers to obtain compacted Ni-graphene structures, which were then consolidated with sintering.

Example 7: Graphene-Bonded High-Impact Polystyrene (HIPS) Films

HIPS films were spray-coated with a pristine graphene-adhesive solution containing 5% by weight graphene sheets and 0.01% by weight epoxy resin. The resulting structure was run through the gap between two rollers. Upon removal of the liquid medium (acetone) and cured at 150° C. for 15 minutes, graphene sheets were well bonded to plastic film surfaces.

After this treatment, the graphene-bonded plastic films were subjected to electrochemical nickel plating. For this, the graphene-coated HIPS films were treated for 5-150 minutes in a Watts electrolyte, containing 1.2 M $NiSO_4.7H_2O$, 0.2 M $NiCl_2.6H_2O$ and 0.5 M $H_3BO_3$. The initial current density was 0.3 $A/dm^2$, and the nickel plating was carried out at 40° C. Thin Ni coating layers, having a thickness from 5 nm to 220 nm, on graphene sheet surfaces were obtained by varying the current density and plating time. The HIPS films of these specimens were then dissolved in toluene, leaving behind freestanding layers of Ni-covered graphene sheets. These layers were consolidated by heating to melt out Ni above the melting point of Ni, which were slightly compressed and then cooled.

Example 8: Electroless Plating of Ni on Graphene Oxide Surfaces

For preparing the Ni/graphene sheets, the stoichiometric molar ratios of the elements C, Ni, and B, which were originally from the graphite, $NiSO_4.6H_2O$, and $NaBH_4$, respectively, was controlled at 125:9:30. A solution of $NiSO_4.6H_2O$ was added to the as-prepared suspension of graphene oxide sheets, and the concentration of $Ni^{2+}$ was adjusted to 0.006 mol/L with deionized water. The mixture was stirred for 2 h, and then aqueous ammonia was added to adjust the pH value. When the pH reached a value of 10.0, an aqueous $NaBH_4$ solution (0.2 mol/L) with the desired mole number of B was trickled into the mixture. After reaction for 30 min, the Ni/graphene sheets formed were subjected to orientation treatments via vacuum-assisted filtration and washed using deionized water and alcohol sequentially. A few drops of the Ni/graphene sheet-containing solution were dispersed in alcohol for the TEM experiment, and the remaining solution was finally dried at 383 K for 12 h for other characterizations.

The graphene oxide sheets and $Ni^{2+}$ ions were reduced by $NaBH_4$ to form the Ni/graphene sheets at room temperature without any pretreatment such as sensitization and activation. The increased specific surface area of the exfoliated graphene oxide sheets and the interaction between their oxygen-containing functional groups and $Ni^{2+}$ ions resulted in a uniform distribution of Ni on the surface of the graphene sheets.

Example 9: Nanocomposites from Cu-Plated Graphene Sheets

The sensitization of GO sheets was accomplished by dispersing GO sheets in a solution of 0.01 M $SnCl2/0.1$ M HCl for 30 min and then rinsing with DI water. After stirring the GO sheets in an acidic $SnCl_2$ bath, $Sn^{2+}$ ions get adsorbed on the surface of GO sheets.

A volume of 200 mL of electroless Cu plating solution was composed of 2.5 g of $CuSO_4.5H_2O$ as the Cu ion source, 0.8 g of $EDTANa_2.2H_2O$ as complex agent. The pH values of the solutions were adjusted to 11 by sodium hydrate. All solutions were prepared using DI water and reagent grade chemicals. The activated GO sheets were introduced into an electroless copper plating solution under ultrasound baths. GO sheets were reduced to RGO sheets as soon as hydrazine hydrate was added. The temperature was kept at 60° C. Cupric ions are readily reduced to crystalline Cu in the alkaline solution while releasing hydrogen gas. The ultrasound can significantly accelerate the reduction. The color of electroless copper solution remained unchanged after the addition of hydrazine hydrate, but turned into brown within 1 min after the ultrasound was applied. The time was controlled in 1 min after the bubbles come out from the solution. The 2D Cu/RGO sheets were allowed to get oriented via vacuum-assisted filtering and then dried in a vacuum desiccator at room temperature. The resulting layers of Cu-coated RGO sheets were then roll-pressed to produce green compacts prior to sintering or melting/cooling consolidation treatments.

Figure 5A:
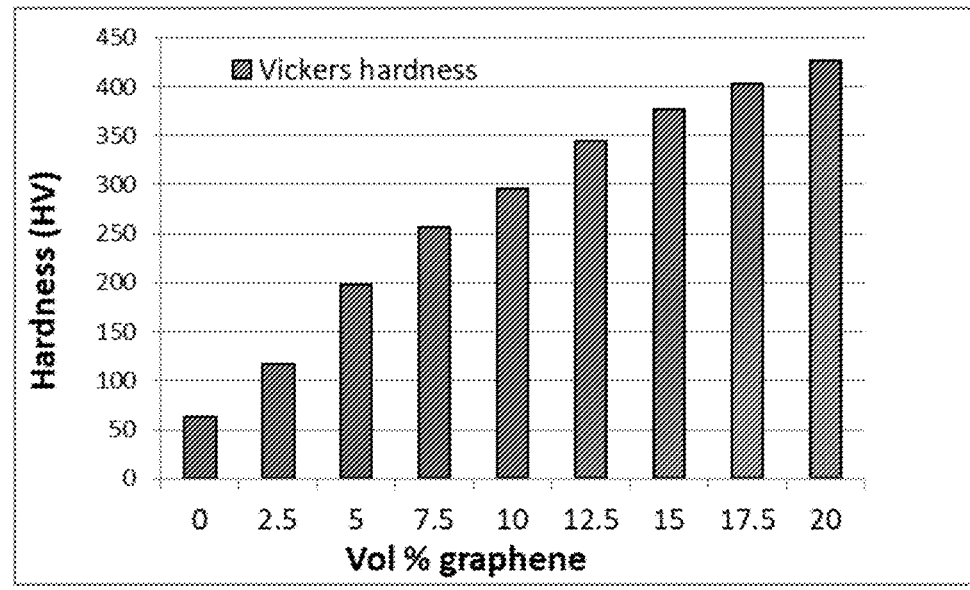
FIG. 5(A) Vickers hardness values of graphene-Cu nanocomposites plotted as a function of the graphene volume fraction.
Figure 5B:
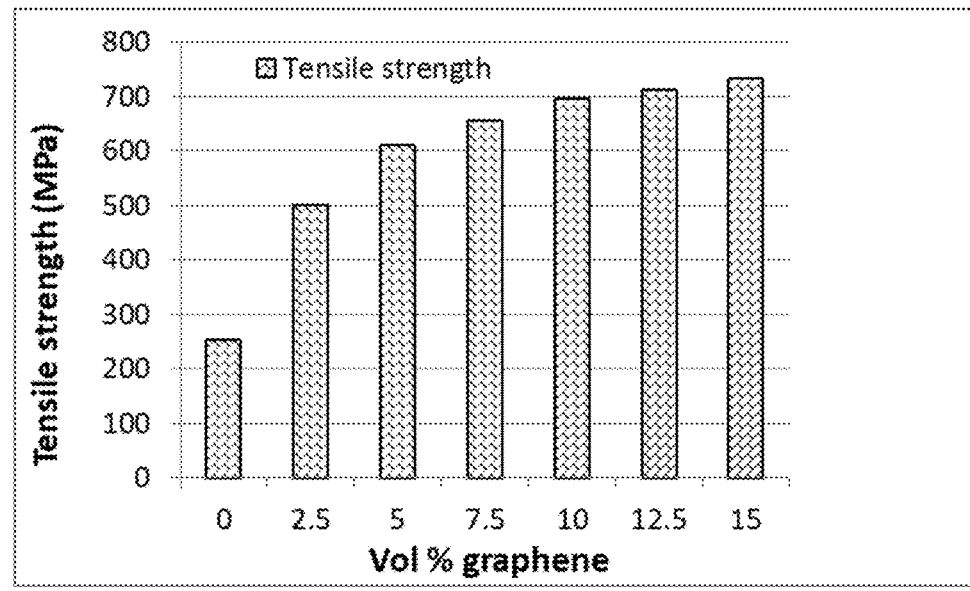
FIG. 5(B) Tensile strength values of graphene-Cu nanocomposites plotted as a function of the graphene volume fraction.
Figure 5C:
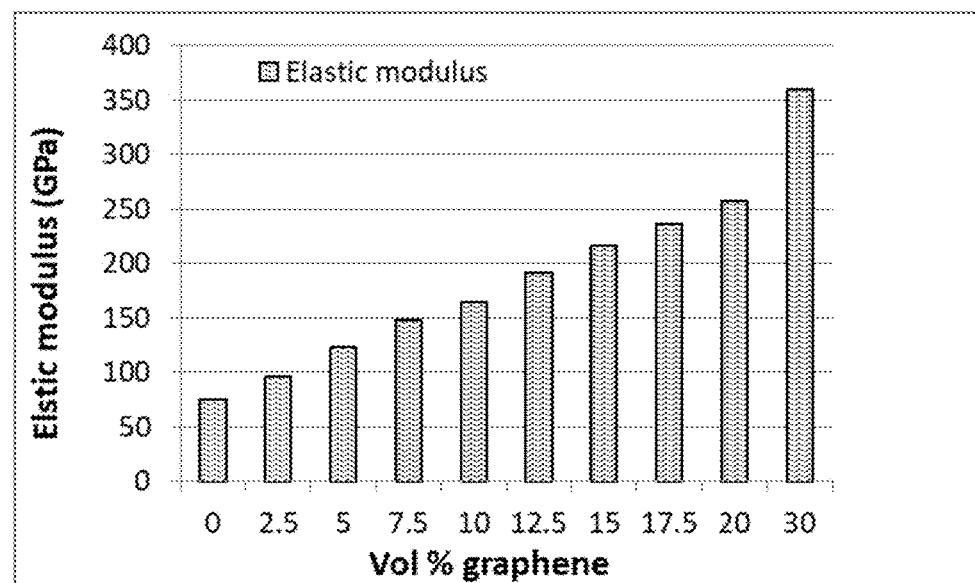
FIG. 5(C) Elastic modulus values of graphene-Cu nanocomposites plotted as a function of the graphene volume fraction.

The Vickers hardness, tensile strength, and elastic modulus values of a series of graphene-Cu nanocomposites, plotted as a function of the graphene volume fraction, are presented in FIG. 5(A), FIG. 5(B), and FIG. 5(C), respectively. These data indicate that the presently disclosed metal matrix nanocomposites exhibit unprecedentedly high mechanical properties for this class of Cu-graphene composites. Graphene-reinforced nanocomposites containing other types of metal matrices are also found to exhibit similar trends in these mechanical properties.

Example 10: Metallization of Graphene-Bonded Polyester Films

Metal films (Co, Mn, etc.) can be deposited onto graphene surfaces using a variety of processes: physical vapor deposition, sputtering, chemical vapor deposition, chemical reduction/oxidation, electrochemical reduction/oxidation, etc. In this example, Co is used as a representative metal and chemical oxidation/reduction from solution is used for deposition of nanocoating on graphene surfaces.

A cobalt salt solution was used as the metal salt solution. The aqueous cobalt (II) salt solution contains 1 to 10 g/L $CoSO_4.7H_2O$ and one oxidizer, hydrogen peroxide. Graphene oxide sheets were dispersed in the solution to form a dispersion. Heating of such a dispersion enabled at least part of the cobalt (II) to be oxidized by $H_2O_2$ into cobalt (III), which was deposited on graphene surfaces upon further heating.

Example 11: Functionalized Graphene-Enabled Metallization of Nylon Films

Nylon films were immersed for 3 minutes at 70° C. in an etching solution consisting of 4 M $H_2SO_4$ and 3.5 M $CrO_3$. The bars were rinsed with water. Separately, a second set of several bars of identical dimensions were used without etching.

Subsequently, the plastic films were dipped into a functionalized graphene-adhesive dispersion containing 5% by weight of graphene sheets (few-layer graphene) and 0.01% by weight of epoxy resin or polyurethane. Chemical functional groups involved in this study include an azide compound (2-azidoethanol), alkyl silane, hydroxyl group, carboxyl group, amine group, sulfonate group ($—SO_3H$), and diethylenetriamine (DETA). These functionalized graphene sheets were supplied from Taiwan Graphene Co., Taipei, Taiwan. Upon removal of the liquid medium (acetone) and cured at 150° C. for 15 minutes, graphene sheets were well bonded to plastic surfaces.

After this treatment, the graphene-bonded plastic films were subjected to chemical nickel plating or chemical copper plating. For nickel plating, the functionalized graphene-bonded films were treated for 15 minutes in a chemical plating solution containing 1.2 M $NiSO_4.7H_2O$ at 40° C. For Cu plating, the functionalized graphene-plastic films were dipped in an ammonia solution with 0.5 M $CuSO_{4.5}H_2O$ having a pH value of 9.5 and a temperature of 20° C. for 30 seconds-20 minutes.

Figure 6:
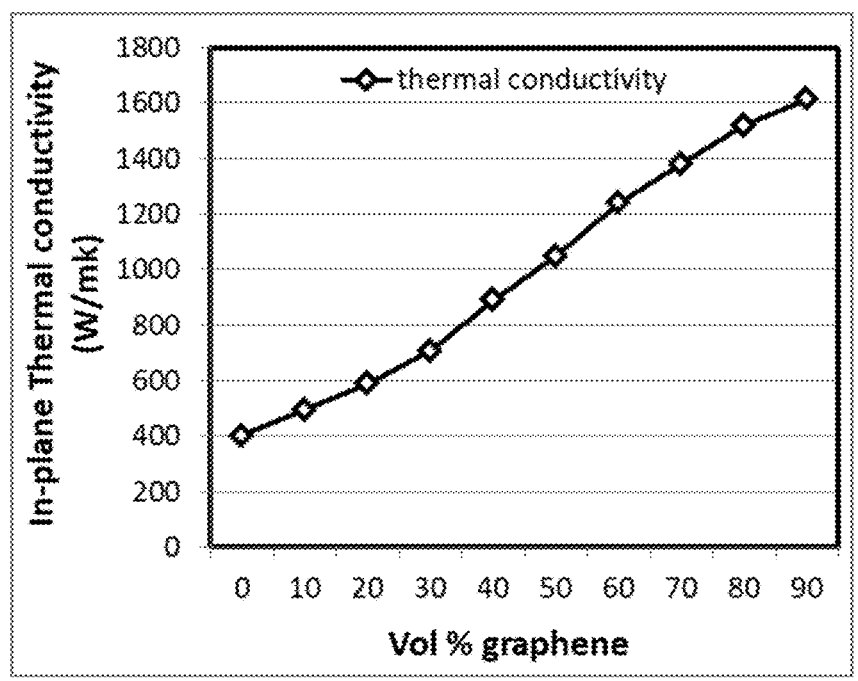
FIG. 6 Thermal conductivity of few-layer graphene-Cu nanocomposites containing graphene sheets having an average of 7.5 graphene planes.

FIG. 6 shows the in-plane thermal conductivity values of a series of few-layer graphene-Cu nanocomposites containing graphene sheets having an average of 7.5 graphene planes, plotted as a function of the volume fraction of graphene. No type of metal matrix composites has previously exhibited a thermal conductivity higher than 1,000 W/mK. The presently disclosed highly oriented graphene-reinforced metal matrix composite can deliver a thermal conductivity as high as 1,615 W/mK.

We claim:

1. A process for producing a metal matrix nanocomposite, said process comprising:
    (A) preparing a graphene dispersion comprising multiple discrete graphene sheets with chemically functionalized graphene sheets having a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof, and dispersed in a liquid adhesive resin;
    (B) bringing said graphene dispersion in physical contact with a solid substrate surface and aligning said graphene sheets along a planar direction of said substrate surface wherein said graphene sheets are bonded to and supported by said substrate surface;
    (C) depositing a layer of a metal or metal alloy having a thickness from 0.5 nm to 10 μm, onto surfaces of said aligned graphene sheets to form a layer of metal-coated graphene sheets supported by said substrate surface, wherein said metal or metal alloy contains a transition metal, aluminum (Al), magnesium (Mg), tin (Sn), indium (In), lead (Pb), an alloy thereof, or a combination thereof; and
    (D) separating said layer of metal-coated graphene sheets from said substrate surface and consolidating said layer of metal-coated graphene sheets into a metal matrix nanocomposite wherein said graphene sheets are dispersed in said matrix material, substantially aligned to be parallel to one another, and in an amount from 0.1% to 95% by volume based on the total nanocomposite volume;
    wherein said multiple graphene sheets contain single-layer or few-layer graphene sheets selected from a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein said chemically functionalized graphene is not graphene oxide.

2. The process of claim 1, wherein said step (B) includes a procedure selected from spraying, painting, coating, casting, or printing a layer of said graphene dispersion onto said substrate surface and aligning said graphene sheets along a planar direction of said substrate surface so that said graphene sheets are substantially parallel to one another and are bonded to and supported by said substrate surface.

3. The process of claim 1, wherein said solid substrate contains a polymer film having a thickness from 5 μm to 200 μm.

4. The process of claim 1, wherein said step (B) includes a procedure (i) of feeding a continuous polymer film, as said solid substrate, from a polymer film feeder into a graphene deposition chamber containing said graphene dispersion therein and a procedure (ii) of operating the graphene deposition chamber to deposit the graphene sheets and the adhesive resin to at least a primary surface of the polymer film for forming a graphene-coated polymer film; and wherein said step (C) includes moving the graphene-coated polymer film into a metallization chamber which accommodates a plating solution for plating a layer of said metal or metal alloy onto the graphene-coated polymer film to obtain said layer of metal-coated graphene sheets supported on said polymer film; and said step further includes a procedure of operating a winding roller to collect layer of metal-coated graphene sheets supported on said polymer film.

5. The process of claim 1, wherein said step (C) includes immersing said graphene sheets supported on said substrate surface into a metallization chamber which accommodates a plating solution for plating a layer of said metal or metal alloy onto the graphene sheets to obtain said layer of metal-coated graphene sheets supported on said substrate surface.

6. The process of claim 1, wherein said step (C) includes operating a procedure of sputtering, physical vapor deposition, chemical vapor deposition, plasma-assisted deposition, spraying, painting, coating, casting, or printing for depositing said thin layer of metal or metal alloy onto said graphene sheets.

7. The process of claim 1, wherein said graphene sheets are in an amount from 10% to 95% by volume and graphene sheets are spaced by said matrix material having an average spacing from 1 nm to 300 nm.

8. The process of claim 1, wherein said graphene sheets are in an amount from 20% to 95% by volume and graphene sheets are spaced by said matrix material having an average spacing from 1 nm to 150 nm.

9. The process of claim 1, wherein said graphene sheets are in an amount from 50% to 95% by volume and graphene sheets are spaced by said matrix material having an average spacing from 1 nm to 70 nm.

10. The process of claim 1, wherein said graphene sheets are in an amount from 75% to 95% by volume and graphene sheets are spaced by said matrix material having an average spacing from 1 nm to 30 nm.

11. The process of claim 1, wherein said graphene sheets contain mostly single-layer graphene having an average number of layers between 1 and 2.

12. The process of claim 1, wherein said graphene sheets contain single-layer graphene and few-layer graphene sheets having an average number of layers less than 5.

* * * * *